US012135827B2

(12) United States Patent
Zhu et al.

(10) Patent No.: US 12,135,827 B2
(45) Date of Patent: Nov. 5, 2024

(54) ANTI-MALICIOUS METHOD, DEVICE AND MEDIUM FOR SECURE THREE-PARTY COMPUTATION

(71) Applicant: BEIHANG UNIVERSITY, Beijing (CN)

(72) Inventors: Haogang Zhu, Beijing (CN); Shizhao Peng, Beijing (CN); Jiarui Tu, Beijing (CN)

(73) Assignee: BEIHANG UNIVERSITY (CN)

( * ) Notice: Subject to any disclaimer, the term of this patent is extended or adjusted under 35 U.S.C. 154(b) by 0 days.

(21) Appl. No.: 18/376,722

(22) Filed: Oct. 4, 2023

(65) Prior Publication Data

US 2024/0338489 A1 Oct. 10, 2024

(30) Foreign Application Priority Data

Apr. 4, 2023 (CN) .......................... 202310354833.7

(51) Int. Cl.
*G06F 21/64* (2013.01)
*H04L 9/08* (2006.01)
(Continued)

(52) U.S. Cl.
CPC ............ *G06F 21/64* (2013.01); *H04L 9/0861* (2013.01); *G06F 21/602* (2013.01);
(Continued)

(58) Field of Classification Search
None
See application file for complete search history.

(56) References Cited

U.S. PATENT DOCUMENTS

| 8,059,816 B2 * | 11/2011 | Bai ........................ H04L 9/085 |
| | | 380/278 |
| 9,069,692 B2 * | 6/2015 | Chu ........................ G06F 11/10 |

(Continued)

FOREIGN PATENT DOCUMENTS

| CN | 101047391 A | * 10/2007 | |
| CN | 100568755 C | * 12/2009 | ......... H03M 13/1111 |

(Continued)

OTHER PUBLICATIONS

Wenliang Du and Zhijun Zhan, (A Practical Approach to Solve Secure Multi-Party Computation Problems), pp. 9, New Security Paradigms Workshop in Virginia, Sep. 23-26, 2002.*

(Continued)

*Primary Examiner* — Eleni A Shiferaw
*Assistant Examiner* — Ali H. Cheema
(74) *Attorney, Agent, or Firm* — Dickinson Wright PLLC

(57) ABSTRACT

The present disclosure provides an anti-malicious method, device and medium for secure three-party computation, and relates to the field of data security. The method includes the following: Respective private data matrices of three participants are determined; each participant receives a corresponding random matrix pair generated by a commodity server node; and based on the random matrix pair, a corresponding internal matrix is generated in a computational process of the three participants, and corresponding security constraints are separately added to a computational process in which a collusion behavior exists and no collusion behavior exists. The security constraints implement a constraint on a rank of an internal matrix, so that any participant in the computational process cannot predict private data matrices of another two participants. The present disclosure can improve data security of the secure three-party computation.

12 Claims, 6 Drawing Sheets

(51) Int. Cl.
*G06F 21/60* (2013.01)
*G06F 21/62* (2013.01)

(52) U.S. Cl.
CPC ........ *G06F 21/6245* (2013.01); *H04L 9/0869* (2013.01); *H04L 2209/46* (2013.01)

(56) References Cited

U.S. PATENT DOCUMENTS

| | | | | |
|---|---|---|---|---|
| 10,395,180 | B2 * | 8/2019 | Wang | G06F 21/6254 |
| 2006/0036927 | A1 * | 2/2006 | Kyung | H03M 13/1134 |
| | | | | 714/758 |
| 2010/0054470 | A1 * | 3/2010 | Schneider | H04L 9/085 |
| | | | | 380/255 |
| 2018/0373834 | A1 * | 12/2018 | Cho | G16B 50/30 |
| 2019/0156243 | A1 * | 5/2019 | Li | G06N 20/00 |
| 2019/0324849 | A1 * | 10/2019 | Kim | H03M 13/1131 |
| 2020/0351862 | A1 * | 11/2020 | Andersson | H04L 1/0072 |
| 2021/0297252 | A1 * | 9/2021 | Licciardello | H04L 9/0866 |
| 2021/0406672 | A1 * | 12/2021 | Hoang | G06F 12/0238 |
| 2022/0103355 | A1 * | 3/2022 | Lo | H04L 9/0656 |

FOREIGN PATENT DOCUMENTS

| | | | | |
|---|---|---|---|---|
| CN | 1947368 | B * | 6/2010 | ......... H03M 13/116 |
| CN | 110546642 | A * | 12/2019 | ........... G06F 21/602 |
| CN | 111143761 | A * | 5/2020 | ............ G06F 17/16 |
| CN | 112183757 | A * | 1/2021 | ............ G06N 20/00 |
| CN | 112183759 | A * | 1/2021 | ............ G06N 20/00 |
| CN | 112231561 | A * | 1/2021 | ........ G06F 16/9535 |
| CN | 112541564 | A * | 3/2021 | ............ G06N 3/045 |
| CN | 112560106 | A * | 3/2021 | ........ G06F 21/6245 |
| CN | 112597540 | A * | 4/2021 | ........ G06F 21/6245 |
| CN | 113610235 | A * | 11/2021 | |
| CN | 115982773 | A * | 4/2023 | |
| CN | 111523674 | B * | 8/2023 | ........... G06F 18/214 |
| CN | 116760539 | A * | 9/2023 | |
| KR | 20160030874 | A * | 3/2016 | ............. H04L 9/008 |

OTHER PUBLICATIONS

Seyed Reza Hoseini Najarkolaei, Mohammad Ali Maddah-Ali, and Mohammad Reza Aref, (Coded Secure Multi-Party Computation for Massive Matrices with Adversarial Nodes), pp. 41, Apr. 10, 2020.*
Peter Kairouz, Sewoong Oh, and Pramod Viswanath, (Differentially Private Multi-party Computation: Optimality of Non-Interactive Randomized Response), pp. 21, Oct. 7, 2014.*
Wenting Zheng, Raluca Ada Popa, Joseph E. Gonzalez, and Ion Stoica, (Helen: Maliciously Secure Coopetitive Learning for Linear Models), pp. 36, Sep. 3, 2019.*
Jinbao Zhu, Qifa Yan, and Xiaohu Tang, (Improved Constructions for Secure Multi-Party Batch Matrix Multiplication), pp. 36, Jul. 20, 2021.*
Jonathan M. Bloom, (Secure multi-party linear regression at plaintext speed), pp. 9, Jul. 10, 2019.*
Rafael Harth, (Matrix Operations in Multi-Party Computation), pp. 73, Oct. 23, 2019.*
Xiling Li, Rafael Dowsley and Martine De Cock, (Privacy-Preserving Feature Selection with Secure Multiparty Computation), pp. 8, Feb. 6, 2021.*
Jean-Guillaume Dumas, Pascal Lafourcade, Jean-Baptiste Orfila, and Maxime Puys, (Private Multi-party Matrix Multiplication and Trust Computations), pp. 15, Jul. 13, 2016.*
Hanzaleh Akbari Nodehi, and Mohammad Ali Maddah-Ali, (Secure Coded Multi-Party Computation for Massive Matrix Operations), pp. 35, Sep. 15, 2020.*
Andreea B. Alexandru and George J. Pappas, (Secure Multi-party Computation for Cloud-based Control), pp. 29, Jun. 23, 2019.*
Haiyan Xiao and Xiaoyuan Yang, (Secure Multi-Party Confidential Protocol of Matrix Factorization), pp. 5, IEEE (Year: 2013).*
First Office Action with English Translation for Chinese Application No. 202310354833.7, dated Sep. 8, 2023, 8 pages.
Notification of Grant with English Translation for Chinese Application No. 202310354833.7, dated Oct. 30, 2023, 5 pages.

* cited by examiner (a)

(b)

ANTI-MALICIOUS METHOD, DEVICE AND MEDIUM FOR SECURE THREE-PARTY COMPUTATION

CROSS REFERENCE TO RELATED APPLICATION

This patent application claims the benefit and priority of Chinese Patent Application No. 202310354833.7, filed with the China National Intellectual Property Administration on Apr. 4, 2023, the disclosure of which is incorporated by reference herein in its entirety as part of the present application.

TECHNICAL FIELD

The present disclosure relates to the field of data security, and in particular, to an anti-malicious method, device and medium for secure three-party computation.

BACKGROUND

As the society enters a data element era, the international situation becomes more uncertain, and data element problems become more complex. In the field of privacy computing, personal data security, data analysis and circulation within and among enterprises, and global data cross-border transactions face various challenges. With security standardization and normalization of relevant industry departments, this technology has been steadily developed. Secure multi-party computation is a common technical solution in the field of privacy computing, and plays an important role especially in commercial applications of emerging digital industries such as data governance, data collaboration, and artificial intelligence.

Most of existing secure multi-party computation technologies are based on a hypothesis of a semi-honest model. That is, in a computational task, participants all run according to a rule and a specified protocol. After the computation, each participant can only obtain a data result of the participant itself, and cannot learn of any input/output information about another participant. Since an entire process includes a computation phase and a communication phase, there is a risk of data leakage. First, in a computation phase, although a participant runs strictly according to a protocol instruction, a curious semi-honest node uses an intermediate computational result in an execution protocol to inversely estimate raw data information of another participant. Second, in a communication phase after the computation is completed, there is a case in which participant nodes cooperate with each other, and raw data information of remaining participants is estimated by sharing data with each other. Therefore, different secure multi-party participation solutions respectively adopt the following mainstream solutions according to respective technical features:

(1) A secret sharing-based multiplication anti-collusion technology Collusion is prevented by introducing a large quantity of external nodes to store and compute secret fragments split from participant data, where a threshold value of Shamir key sharing determines a security level of the solution against collusion. However, in this method, matrix multiplication is split into vector fragments to perform a polynomial operation, resulting in a large quantity of communication overheads.

(2) A multiplication anti-collusion technology based on homomorphic encryption A computational complexity theory based on a mathematical problem uses ciphertext to compute data to ensure data security and prevent collusion between nodes. However, in this solution, because encryption of a large prime is introduced, a quantity of computation ciphertext bits increases, which not only increases computational overheads, but also cannot ensure reliability of a computational result in a case of a floating-point quantity.

(3) A multiplication anti-collusion technology based on a random permutation matrix A special coefficient matrix is designed to encrypt raw data information, so that a piece of random disturbance matrix information is obfuscated in an intermediate computational result, which can effectively prevent collusion of the participant nodes. However, in this solution, stability of additive disturbance cannot be ensured, and therefore, there is a risk of leaking local zero element information of a matrix.

In summary, data security of an existing secure multi-party computation solution needs to be improved.

SUMMARY

Based on this, embodiments of the present disclosure provide an anti-malicious method, device and medium for secure three-party computation, so as to improve data security of the secure three-party computation.

To achieve the above objective, the present disclosure provides the following technical solutions.

An anti-malicious method for secure three-party computation includes:

determining a first private data matrix, a second private data matrix, and a third private data matrix, where the first private data matrix is in $n \times s$ dimensions, held by a first participant, and stored in a compute node thereof, the second private data matrix is in $s \times t$ dimensions, held by a second participant, and stored in a compute node thereof, and the third private data matrix is in $t \times m$ dimensions, held by a third participant, and stored in a compute node thereof;

receiving, by the first participant, a first random matrix pair generated by a commodity server node, receiving, by the second participant, a second random matrix pair generated by the commodity server node, and receiving, by the third participant, a third random matrix pair generated by the commodity server node, where the first random matrix pair includes a first random matrix in $n \times s$ dimensions and a second random matrix in $n \times m$ dimensions, the second random matrix pair includes a third random matrix in $s \times t$ dimensions and a fourth random matrix in $n \times m$ dimensions, and the third random matrix pair includes a fifth random matrix in $t \times m$ dimensions and a sixth random matrix in $n \times m$ dimensions;

determining whether a collusion behavior exists when the first participant, the second participant, and the third participant perform a secure computation process;

if no collusion behavior exists, performing a first computational process that meets a first security constraint, a second computational process without a security constraint, or a third computational process that meets a second security constraint, to obtain a first output matrix output by the first participant, a second output matrix output by the second participant, and a third output matrix output by the third participant;

if a collusion behavior exists, performing a first computational process that meets a third security constraint, a second computational process that meets a fourth security constraint, or a third computational process that meets a fifth security constraint, to obtain a first output matrix output by the first participant, a second output matrix output by the second participant, and a third output matrix output by the third participant;

obtaining, by a computation requestor, the first output matrix, the second output matrix, and the third output matrix, and performing an operation on the first output matrix, the second output matrix, and the third output matrix according to a target requirement;

the first computational process including:

computing, by the first participant, a first internal matrix according to a formula $\hat{A}=A+R_a$, and sending the first internal matrix to the second participant, where $\hat{A}$ represents the first internal matrix, A represents the first private data matrix, and Ra represents the first random matrix;

computing, by the third participant, a third internal matrix according to a formula $\hat{C}=C+R_c$, and sending the third internal matrix to the second participant, $\hat{C}$ where represents the third internal matrix, C represents the third private data matrix, and $R_c$ represents the fifth random matrix;

computing, by the second participant, a second internal matrix, a second M matrix, a first intermediate term matrix, a second intermediate term matrix, a third intermediate term matrix, and a fourth intermediate term matrix according to formulas $\hat{B}=B+R_b$, $M_b=\hat{A}\cdot R_b\cdot\hat{C}$, $\varphi_1=\hat{A}\cdot\hat{B}$, $\gamma_1=\hat{A}\cdot R_b$, $\varphi_1=\hat{B}\cdot\hat{C}$ and $\gamma_2=R_b\cdot\hat{C}$, sending the third intermediate term matrix and the fourth intermediate term matrix to the first participant, and sending the first intermediate term matrix and the second intermediate term matrix to the third participant, where $\hat{B}$ represents the second internal matrix, $M_b$ represents the second M matrix, $\varphi_1$ represents the first intermediate term matrix, $\gamma_1$ represents the second intermediate term matrix, $\varphi_2$ represents the third intermediate term matrix, $\gamma_2$ represents the fourth intermediate term matrix, B represents the second private data matrix, and $R_b$ represents the third random matrix;

computing, by the first participant, a first S matrix and a first M matrix according to formulas $S_a=R_a\cdot\gamma_2=R_a\cdot R_b\hat{C}$ and $M_a=A\cdot\varphi_2=A\cdot\hat{B}\cdot\hat{C}$, where $S_a$ represents the first S matrix, and $M_a$ represents the first M matrix;

computing, by the third participant, a third S matrix and a third M matrix according to formulas $S_c=\gamma_1\cdot R_c=\hat{A}R_b\cdot R_c$ and $M_c=\varphi_1\cdot R_c=\hat{A}\cdot\hat{B}\cdot R_c$, where $S_c$ represents the third S matrix, and $M_c$ represents the third M matrix;

splitting, by the second participant, the second internal matrix into a column full rank matrix and a row full rank matrix by means of full rank decomposition, sending the column full rank matrix to the first participant, and sending the row full rank matrix to the third participant;

generating, by the first participant, a first output matrix based on the column full rank matrix, computing a first T matrix and a first t matrix according to formulas $T_a=M_a+S_a-V_a-r_a$ and $t_1=R_aB_1$, sending the first T matrix and the first t matrix to the second participant, where $T_a$ represents the first T matrix, $t_1$ represents the first t matrix, $V_a$ represents the first output matrix, $r_a$ represents the second random matrix, $B_1$ represents the column full rank matrix, and a space in which $B_1$ belongs to is in s×r dimensions;

computing, by the third participant, a second t matrix according to a formula $t_2=B_2R_c$, and sending the second t matrix to the second participant, where $t_2$ represents the second t matrix, $B_2$ represents the row full rank matrix, and a space in which $B_2$ belongs to is in r×t dimensions;

generating, by the second participant, a second output matrix based on the first T matrix, the first t matrix, and the second t matrix, computing a second S matrix according to a formula $S_b=t_1\cdot t_2=R_aB_1\cdot B_2R_c=R_a\hat{B}R_c$, computing a second T matrix through a formula $T_b=T_a-M_b+S_b-V_b-r_b$ according to the second S matrix, and sending the second T matrix to the third participant, where $S_b$ represents the second S matrix, Tb represents the second T matrix, $V_b$ represents the second output matrix, and $R_b$ represents the fourth random matrix;

computing, by the third participant, a third output matrix according to a formula $V_c=T_b-M_c+S_c-r_c$, where $V_c$ represents the third output matrix, and $r_c$ represents the sixth random matrix;

the second computational process including:

computing, by the first participant, a first internal matrix according to a formula $\hat{A}=A+R_a$, and sending the first internal matrix to the second participant;

computing, by the third participant, a third internal matrix according to a formula $\hat{C}=C+R_c$, and sending the third internal matrix to the second participant;

computing, by the second participant, a second internal matrix, a second M matrix, a first intermediate term matrix, a second intermediate term matrix, a third intermediate term matrix, and a fourth intermediate term matrix according to formulas $\hat{B}=B+R_b$, $M_b=\hat{A}\cdot R_b\cdot\hat{C}$, $\varphi_1=\hat{A}\cdot\hat{B}$, $\gamma_1=\hat{A}\cdot R_b$, $\varphi_1=\hat{B}\cdot\hat{C}$ and $\gamma_2=R_b\cdot\hat{C}$, sending the third intermediate term matrix and the fourth intermediate term matrix to the first participant, and sending the first intermediate term matrix and the second intermediate term matrix to the third participant;

computing, by the first participant, a first S matrix and a first M matrix according to formulas $S_a=R_a\cdot\gamma_2=R_a\cdot R_b\hat{C}$ and $M_a=A\cdot\varphi_2=A\cdot\hat{B}\cdot\hat{C}$;

computing, by the third participant, a third S matrix and a third M matrix according to formulas $S_c=\gamma_1\cdot R_c=\hat{A}R_b\cdot R_c$ and $M_c=\varphi_1\cdot R_c=\hat{A}\cdot\hat{B}\cdot R_c$;

splitting, by the second participant, the second internal matrix into a column full rank matrix and a row full rank matrix by means of full rank decomposition, sending the column full rank matrix to the first participant, and sending the row full rank matrix to the third participant;

generating, by the first participant, a first output matrix based on the column full rank matrix, computing a first T matrix and a first t matrix according to formulas $T_a=M_a+S_a-V_a-r_a$ and $t_1=R_aB_1$, sending the first T matrix to the second participant, and sending the first t matrix to the third participant;

computing, by the third participant, a second t matrix according to a formula $t_2=B_2R_c$;

generating, by the second participant, a second output matrix based on the first T matrix, computing a second T matrix according to a formula $T_b=T_a-M_b-V_b-r_b$, and sending the second T matrix to the third participant;

computing, by the third participant, a second S matrix according to a formula $S_b=t_1\cdot t_2=R_aB_1\cdot B_2R_c=R_a\hat{B}R_c$, and computing a third output matrix through a formula $V_c=T_b+S_b-M_c+S_c-r_c$ according to the second S matrix and the second T matrix;

the third computational process including:

computing, by the first participant, a first internal matrix according to a formula $\hat{A}=A+R_a$, and sending the first internal matrix to the second participant;

computing, by the third participant, a third internal matrix according to a formula $\hat{C}=C+R_c$, and sending the third internal matrix to the second participant;

computing, by the second participant, a second internal matrix, a second M matrix, a first intermediate term matrix, a second intermediate term matrix, a third intermediate term matrix, and a fourth intermediate term matrix according to formulas $\hat{B}=B+R_b$, $M_b=\hat{A}\cdot R_b\cdot\hat{C}$, $\varphi_1=\hat{A}\cdot\hat{B}$, $\gamma_1=\hat{A}\cdot R_b$, $\varphi_1=\hat{B}\cdot\hat{C}$ and $\gamma_2=R_b\cdot\hat{C}$, sending the third intermediate term matrix and the fourth intermediate term matrix to the first participant, and sending the first intermediate term matrix and the second intermediate term matrix to the third participant;

computing, by the first participant, a first S matrix and a first M matrix according to formulas $S_a=R_a\cdot\gamma_2=R_a\cdot R_b\hat{C}$ and $M_a=A\cdot\varphi_2=A\cdot\hat{B}\cdot\hat{C}$;

computing, by the third participant, a third S matrix and a third M matrix according to formulas $S_c=\gamma_1\cdot R_c=\hat{A}R_b\cdot R_c$ and $M_c\varphi_1\cdot R_c=\hat{A}\cdot\hat{B}\cdot R_c$;

sending, by the second participant, the second internal matrix to the first participant;

generating, by the first participant, a first output matrix based on the second internal matrix, computing a first T matrix and a first t matrix according to formulas $T_a=M_a+S_a-V_a-r_a$ and $t_1=R_a\hat{B}$, sending the first T matrix to the second participant, and sending the first t matrix to the third participant;

computing, by the third participant, a second S matrix according to a formula $S_b=t\cdot R_c=R_a\hat{B}R_c$;

generating, by the second participant, a second output matrix based on the first T matrix, computing a second T matrix according to a formula $T_b=T_a-M_b-V_b-r_b$, and sending the second T matrix to the third participant; and computing, by the third participant, a third output matrix according to a formula $V_c=T_b+S_b-M_c+S_c-r_c$, where the first security constraint is $r(\hat{B})<\min\{s,t\}$, the second security constraint is $r(\hat{B})<s$, the third security constraint is $r(\hat{A})<s$, $r(\hat{B})<\min\{s,t\}$ and $r(\hat{C})<t$, the fourth security constraint is $r(\hat{A})<s$, $r(\hat{C})<t$ and $r(B_1)<s$, the fifth security constraint is $r(\hat{A})<s$, $r(\hat{B})<s$ and $r(\hat{C})<t$, and $r(\ )$ represents a rank of a matrix.

An electronic device is provided, including a memory and a processor, where the memory is configured to store a computer program, and the processor runs the computer program, to enable the electronic device to perform the above-described anti-malicious method for secure three-party computation.

A computer-readable storage medium is provided, where the computer-readable storage medium stores a computer program, and the computer program is executed by a processor to implement the above-described anti-malicious method for secure three-party computation.

According to specific embodiments provided in the present disclosure, the present disclosure provides the following technical effects:

Embodiments of the present disclosure provide an anti-malicious method, device and medium for secure three-party computation, separately add corresponding security constraints to a computational process in which a collusion behavior exists and no collusion behavior exists. The security constraints implement a constraint on a rank of an internal matrix, so that any participant in the computational process cannot predict private data matrices of another two participants, thereby improving data security of the secure three-party computation, which is applicable to a scenario in which a security requirement is relatively high.

BRIEF DESCRIPTION OF THE DRAWINGS

To describe technical solutions in embodiments of the present disclosure or in the conventional technology more clearly, the following briefly describes accompanying drawings required for describing embodiments. Apparently, the accompanying drawings in the following description merely show some embodiments of the present disclosure, and a person of ordinary skill in the art may still derive other drawings from these accompanying drawings without creative efforts.

DETAILED DESCRIPTION OF THE EMBODIMENTS

Technical solutions of embodiments of the present disclosure are clearly and fully described below with reference to accompanying drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

To make the foregoing objectives, features, and advantages of the present disclosure clearer and more comprehensible, the present disclosure will be further described in detail below with reference to the accompanying drawings and specific implementations.

Figure 1:
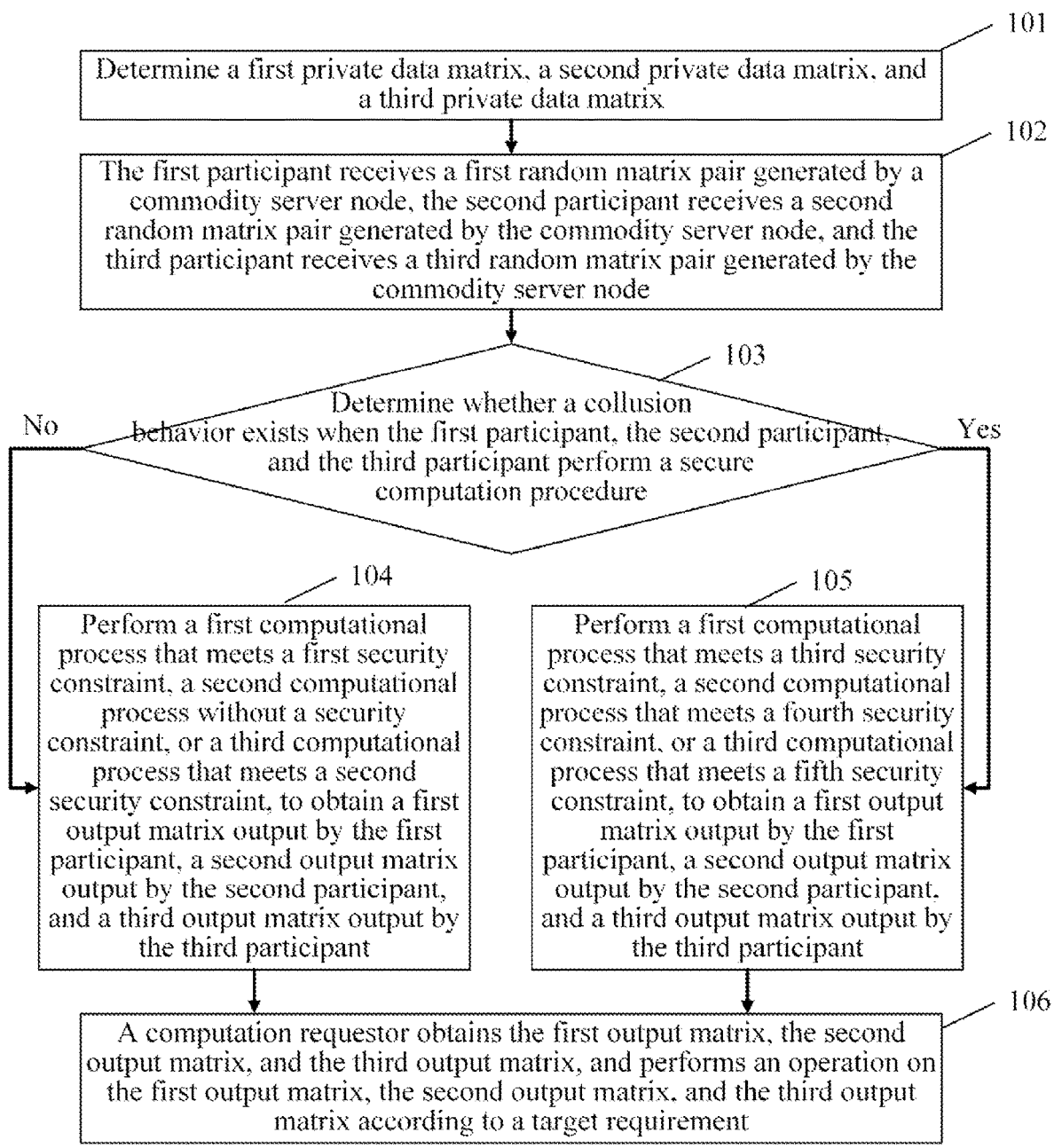
FIG. 1 is a flowchart of an anti-malicious method for secure three-party computation according to an embodiment of the present disclosure.

With reference to FIG. 1, an anti-malicious method for secure three-party computation in this embodiment includes the following steps:

Step 101: Determine a first private data matrix, a second private data matrix, and a third private data matrix.

The first private data matrix is in n×s dimensions, held by a first participant, and stored in a compute node thereof, the second private data matrix is in s×t dimensions, held by a second participant, and stored in a compute node thereof, and the third private data matrix is in t×m dimensions, held by a third participant, and stored in a compute node thereof.

Step 102: The first participant receives a first random matrix pair generated by a commodity server node, the second participant receives a second random matrix pair generated by the commodity server node, and the third participant receives a third random matrix pair generated by the commodity server node.

The first random matrix pair includes a first random matrix in n×s dimensions and a second random matrix in n×m dimensions, the second random matrix pair includes a third random matrix in s×t dimensions and a fourth random matrix in n×m dimensions, and the third random matrix pair includes a fifth random matrix in t×m dimensions and a sixth random matrix in n×m dimensions.

A sum of the second random matrix, the fourth random matrix, and the sixth random matrix is equal to a product of the first random matrix, the third random matrix, and the fifth random matrix.

Step 103: Determine whether a collusion behavior exists when the first participant, the second participant, and the third participant perform a secure computation process.

When no collusion behavior exists, go to step 104: Perform a first computational process that meets a first security constraint, a second computational process without a security constraint, or a third computational process that meets a second security constraint, to obtain a first output matrix output by the first participant, a second output matrix output by the second participant, and a third output matrix output by the third participant.

When a collusion behavior exists, go to step 105: Perform a first computational process that meets a third security constraint, a second computational process that meets a fourth security constraint, or a third computational process that meets a fifth security constraint, to obtain a first output matrix output by the first participant, a second output matrix output by the second participant, and a third output matrix output by the third participant.

Step 106: A computation requestor obtains the first output matrix, the second output matrix, and the third output matrix, and performs an operation on the first output matrix, the second output matrix, and the third output matrix according to a target requirement. Specifically, if a target requirement of a computation requestor is computing a product of a three-party matrix, a sum value of the first output matrix, the second output matrix, and the third output matrix is determined as a product of the three-party matrix; or a product of the three-party matrix is a product of the first private data matrix, the second private data matrix, and the third private data matrix.

The first computational process includes the following steps:

(10) The first participant computes a first internal matrix according to a formula $\hat{A}=A+R_a$, and sends the first internal matrix to the second participant. $\hat{A}$ represents the first internal matrix, A represents the first private data matrix, and Ra represents the first random matrix.

(11) The third participant computes a third internal matrix according to a formula $\hat{C}=C+R_c$, and sends the third internal matrix to the second participant, where $\hat{C}$ represents the third internal matrix, C represents the third private data matrix, and $R_c$ represents the fifth random matrix.

(12) The second participant computes a second internal matrix, a second M matrix, a first intermediate term matrix, a second intermediate term matrix, a third intermediate term matrix, and a fourth intermediate term matrix according to formulas $\hat{B}=B+R_b$, $M_b=\hat{A}\cdot R_b\cdot \hat{C}$, $\varphi_1=\hat{A}\cdot \hat{B}$, $\gamma_1=\hat{A}\cdot R_b$, $\varphi_1=\hat{B}\cdot \hat{C}$ and $\gamma_2=R_b\cdot \hat{C}$, sends the third intermediate term matrix and the fourth intermediate term matrix to the first participant, and sends the first intermediate term matrix and the second intermediate term matrix to the third participant, where $\hat{B}$ represents the second internal matrix, $M_b$ represents the second M matrix, $\varphi_1$ represents the first intermediate term matrix, $\gamma_1$ represents the second intermediate term matrix, $\varphi_2$ represents the third intermediate term matrix, $\gamma_2$ represents the fourth intermediate term matrix, B represents the second private data matrix, and Rb represents the third random matrix.

(13) The first participant computes a first S matrix and a first M matrix according to formulas $S_a=R_a\cdot \gamma_2=R_a\cdot R_b\hat{C}$ and $M_a=A\cdot \varphi_2=A\cdot \hat{B}\cdot \hat{C}$, where Sa represents the first S matrix, and Ma represents the first M matrix.

(14) The third participant computes a third S matrix and a third M matrix according to formulas $S_c=\gamma_1\cdot R_c=\hat{A}R_b\cdot R_c$ and $M_c=\varphi_1\cdot R_c=\hat{A}\cdot \hat{B}\cdot R_c$, where Sc represents the third S matrix, and Mc represents the third M matrix.

(15) The second participant splits the second internal matrix into a column full rank matrix and a row full rank matrix by means of full rank decomposition, sends the column full rank matrix to the first participant, and sends the row full rank matrix to the third participant.

(16) The first participant generates a first output matrix based on the column full rank matrix, computes a first T matrix and a first t matrix according to formulas $T_a=M_a+S_a-V_a-r_a$ and $t_1=R_aB_1$, and sends the first T matrix and the first t matrix to the second participant, where $T_a$ represents the first T matrix, $t_1$ represents the first t matrix, $V_a$ represents the first output matrix, $r_a$ represents the second random matrix, B1 represents the column full rank matrix, and a space in which $B_1$ belongs to is in s×r dimensions.

(17) The third participant computes a second t matrix according to a formula $t_2=B_2R_c$, and sends the second t matrix to the second participant, where $t_2$ represents the second t matrix, $B_2$ represents the row full rank matrix, and a space in which B2 belongs to is in r×t dimensions.

(18) The second participant generates a second output matrix based on the first T matrix, the first t matrix, and the second t matrix, computes a second S matrix according to a formula $S_b=t_1\cdot t_2=R_aB_1\cdot B_2R_c=R_a\hat{B}R_c$, computes a second T matrix through a formula $T_b=T_a-M_b+S_b-V_b-r_b$ according to the second S matrix, and sends the second T matrix to the third participant, where Sb represents the second S matrix, Tb represents the second T matrix, $V_b$ represents the second output matrix, and $r_b$ represents the fourth random matrix.

(19) The third participant computes a third output matrix according to a formula $V_c=T_b-M_c+S_c-r_c$, where $V_c$ represents the third output matrix, and $R_c$ represents the sixth random matrix.

The second computational process includes the following steps:

(20) The first participant computes a first internal matrix according to a formula $\hat{A}=A+R_a$, and sends the first internal matrix to the second participant.

(21) The third participant computes a third internal matrix according to a formula $\hat{C}=C+R_c$, and sends the third internal matrix to the second participant.

(22) The second participant computes a second internal matrix, a second M matrix, a first intermediate term matrix, a second intermediate term matrix, a third intermediate term matrix, and a fourth intermediate term matrix according to formulas $\hat{B}=B+R_b$, $M_b=\hat{A}\cdot R_b\cdot \hat{C}$, $\varphi_1=\hat{A}\cdot \hat{B}$, $\gamma_1=\hat{A}\cdot R_b$, $\varphi_1=\hat{B}\cdot \hat{C}$ and $\gamma_2=R_b\cdot \hat{C}$, sends the third intermediate term matrix and the fourth intermediate term matrix to the first participant, and sends the first intermediate term matrix and the second intermediate term matrix to the third participant.

(23) The first participant computes a first S matrix and a first M matrix according to formulas $S_a=R_a\cdot \gamma_2=R_a\cdot R_b\hat{C}$ and $M_a=A\cdot \varphi_2=A\cdot \hat{B}\cdot \hat{C}$.

(24) The third participant computes a third S matrix and a third M matrix according to formulas $S_c=\gamma_1\cdot R_c=\hat{A}R_b\cdot R_c$ and $M_c=\varphi_1\cdot R_c=\hat{A}\cdot \hat{B}\cdot R_c$.

(25) The second participant splits the second internal matrix into a column full rank matrix and a row full rank matrix by means of full rank decomposition, sends the column full rank matrix to the first participant, and sends the row full rank matrix to the third participant.

The column full rank matrix and the row full rank matrix meet a constraint condition $r(\hat{B})=r(B_1)=r(B_2)=r$.

(26) The first participant generates a first output matrix based on the column full rank matrix, computes a first T matrix and a first t matrix according to formulas $T_a=M_a+S_a-V_a-r_a$ and $t_1=R_aB_1$, sends the first T matrix to the second participant, and sends the first t matrix to the third participant.

(27) The third participant computes a second t matrix according to a formula $t_2=B_2R_c$.

(28) The second participant generates a second output matrix based on the first T matrix, computes a second T matrix according to a formula $T_b=T_a-M_b-V_b-r_b$, and sends the second T matrix to the third participant.

(29) The third participant computes a second S matrix according to a formula $S_b=t_1 \cdot t_2=R_a B_1 \cdot B_2 R_c=R_a \hat{B} R_c$, and computes a third output matrix through a formula $V_c=T_b+S_b-M_c+S_c-r_c$ according to the second S matrix and the second T matrix.

The third computational process includes the following steps:

(30) The first participant computes a first internal matrix according to a formula $\hat{A}=A+R_a$, and sends the first internal matrix to the second participant.

(31) The third participant computes a third internal matrix according to a formula $\hat{C}=C+R_c$, and sends the third internal matrix to the second participant.

(32) The second participant computes a second internal matrix, a second M matrix, a first intermediate term matrix, a second intermediate term matrix, a third intermediate term matrix, and a fourth intermediate term matrix according to formulas $\hat{B}=B+R_b$, $M_b=\hat{A} \cdot R_b \cdot \hat{C}$, $\varphi_1=\hat{A} \cdot \hat{B}$, $\gamma_1=\hat{A} \cdot R_b$, $\varphi_1=\hat{B} \cdot \hat{C}$ and $\gamma_2=R_b \cdot \hat{C}$, sends the third intermediate term matrix and the fourth intermediate term matrix to the first participant, and sends the first intermediate term matrix and the second intermediate term matrix to the third participant.

(33) The first participant computes a first S matrix and a first M matrix according to formulas $S_a=R_a \cdot \gamma_2=R_a \cdot R_b \hat{C}$ and $M_a=A \cdot \varphi_2=A \cdot \hat{B} \cdot \hat{C}$.

(34) The third participant computes a third S matrix and a third M matrix according to formulas $S_c=\gamma_1 \cdot R_c=\hat{A} R_b \cdot R_c$ and $M_c=\varphi_1 \cdot R_c=\hat{A} \cdot \hat{B} \cdot R_c$.

(35) The second participant sends the second internal matrix to the first participant.

(36) The first participant generates a first output matrix based on the second internal matrix, computes a first T matrix and a first t matrix according to formulas $T_a=M_a+S_a-V_a-r_a$ and $t_1=R_a \hat{B}$, sends the first T matrix to the second participant, and sends the first t matrix to the third participant.

(37) The third participant computes a second S matrix according to a formula $S_b=t \cdot R_c=R_a \hat{B} R_c$.

(38) The second participant generates a second output matrix based on the first T matrix, computes a second T matrix according to a formula $T_b=T_a-M_b-V_b-r_b$, and sends the second T matrix to the third participant.

(39) The third participant computes a third output matrix according to a formula $V_c=T_b+S_b-M_c+S_c-r_c$.

The first security constraint is $r(\hat{B})<\min\{s,t\}$, the second security constraint is $r(\hat{B})<s$, the third security constraint is $r(\hat{A})<s$, $r(\hat{B})<\min\{s,t\}$ and $r(\hat{C})<t$, the fourth security constraint is $r(\hat{A})<s$, $r(\hat{C})<t$ and $r(B_1)s$, the fifth security constraint is $r(\hat{A})<s$, $r(\hat{B})<s$ and $r(\hat{C})<t$, and $r( )$ represents a rank of a matrix.

In actual application, the following further describes the foregoing embodiments in detail by using an example in which a product of a three-party matrix is computed.

First, a secure three-party matrix multiplication problem is defined.

Figure 2:
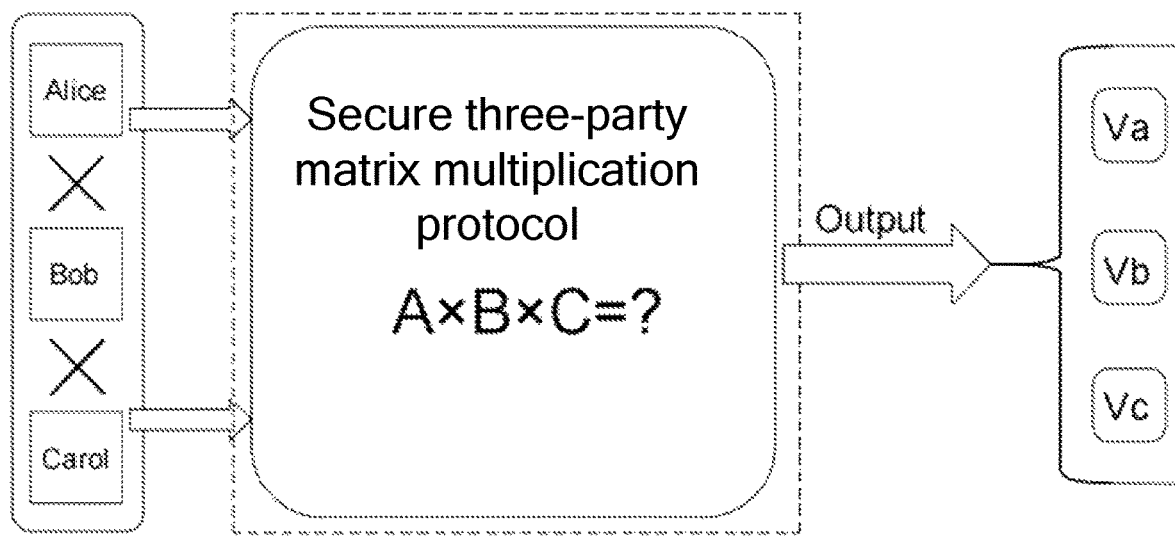
FIG. 2 is a schematic diagram of a secure three-party matrix multiplication problem.

It is known that there are three participants Alice, Bob, Carol, independent of each other and not trusted to each other, Alice holds a private data matrix A which has a dimension of n×s and is only stored at its own compute node, Bob holds a private data matrix B which has a dimension of s×t, and Carol holds a private data matrix C which has a dimension of t×m The three participants perform three-party matrix multiplication protocol computation $f(A,B,C)=ABC=V_a+V_b+V_c$, and finally respectively corresponding dimensions obtained by each computation participant node are output matrices $V_a$、$V_b$、$V_c$ of n×m, and are sent to a computation requestor to aggregate to obtain a desired three-party matrix product result. During a computational process, each participant node can only know its own input/output information, and cannot obtain an intermediate settlement result and holding data information of another participant. A specific schematic diagram is shown in FIG. 2.

Figure 3:
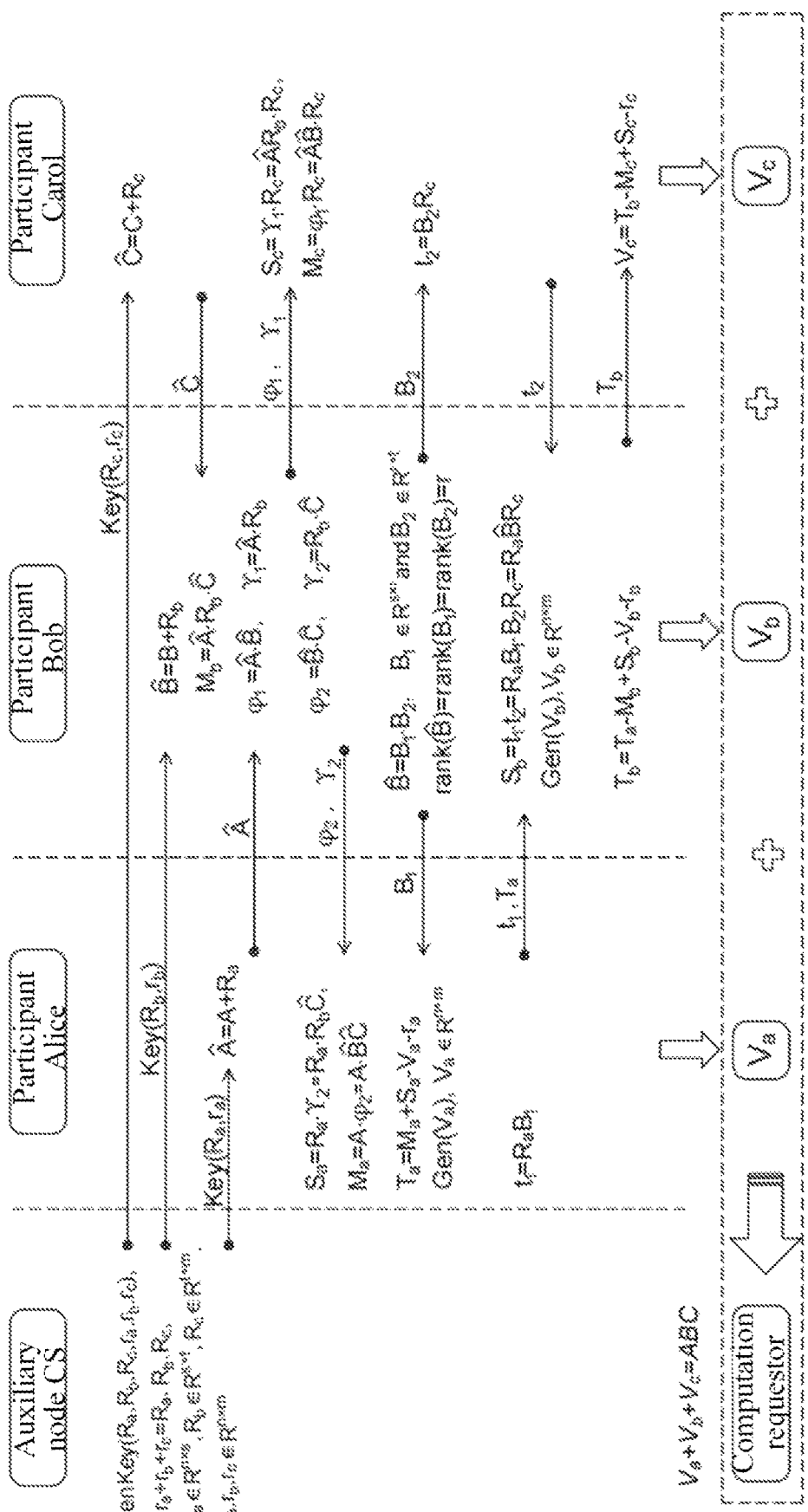
FIG. 3 is a flowchart of a secure three-party multiplication method.

With reference to FIG. 3, the following describes an execution procedure of a secure three-party matrix multiplication method.

Step 1: An auxiliary compute node, also referred to as a commodity server (Commodity Server, CS) node, generates three groups of random matrix pairs. Specific forms of the three groups of random matrix pairs are: a random matrix $R_a$ with a dimension of n×s, a random matrix $R_b$ with a dimension of s×t, a random matrix $R_c$ with a dimension of t×m, and three random matrices $r_a$、$r_b$、$r_c$ with a dimension of n×m. The following constraint $r_a+r_b+r_c=R_a \cdot R_b \cdot R_c$ needs to be strictly met among these random matrices. Then, the CS auxiliary node sends a random matrix pair $(R_a, r_a)$ to the participant Alice compute node, sends a random matrix pair $(R_b, r_b)$ to the participant Bob compute node, and sends a random matrix pair $(R_c, r_c)$ to the participant Carol compute node. When an entire computation protocol is performed, the CS auxiliary node needs to strictly meet the following three requirements: (1) Not contact private data information related to Alice, Bob and Carol, whether an input or output result of an intermediate computational process. (2) Not collude with any participant compute node. (3) Strictly follow a protocol process to correctly perform an assigned subtask. The CS auxiliary node does not directly participate in a subsequently actual computational process of the secure three-party multiplication, only provides a random matrix pair that is independent of a private data matrix at an initial phase for performing a protocol, thereby protecting information of a private matrix of a participant and ensuring security of raw data in a subsequent computational process. Therefore, the auxiliary node CS may generate a large quantity of mutually independent random matrix pairs offline in advance, and send random seeds to Alice, Bob, and Carol compute nodes in an initial trial phase for performing a protocol in a manner similar to commodity sale, so that the compute node can obtain corresponding random matrix information, and the commodity server CS gets its name.

Step 2: After receiving a corresponding random matrix pair $(R_a, r_a)$, the participant Alice computes $\hat{A}=A+R_a$ inside a node and sends it to a participant node Bob.

Step 3: After receiving a corresponding random matrix pair $(R_c, r_c)$, the participant Carol computes $\hat{C}=C+R_c$ inside a node and sends it to a participant node Bob.

Step 4: The participant Bob computes $\hat{B}=B+R_b$, $M_b=\hat{A} \cdot R_b \cdot \hat{C}$ inside a node of the participant Bob, sends $\varphi_1=\hat{A} \cdot \hat{B}$ and $\gamma_1=\hat{A} \cdot R_b$ to the node Carol, and sends $\varphi_1=\hat{B} \cdot \hat{C}$ and $\gamma_2=R_b \cdot \hat{C}$ to the node Alice.

Step 5: After receiving the matrix $\varphi_2$、$\gamma_2$ sent from the Bob node, the participant Alice node successively computes $S_a=R_a \cdot \gamma_2=R_a \cdot R_b \hat{C}$ and $M_a=A \cdot \varphi_2=A \cdot \hat{B} \cdot \hat{C}$ locally.

Step 6: After receiving the matrix $\varphi_1$、$\gamma_1$ sent from the Bob node, the participant Carol node successively computes $S_c=\gamma_1 \cdot R_c=\hat{A} R_b \cdot R_c$ and $M_c=\varphi_1 \cdot R_c=\hat{A} \cdot \hat{B} \cdot R_c$ locally.

Step 7: The participant Bob node internally splits the matrix $\hat{B}$ by means of full rank decomposition, and two submatrices obtained after decomposition are a column full rank matrix $B_1 \in \mathbb{R}^{s \times r}$ and a row full rank matrix $B_2 \in \mathbb{R}^{r \times t}$, where ranks of a non-zero matrix $\hat{B}$ and split matrices $B_1$、$B_2$ meet a constraint condition $r(\hat{B})=r(B_1)=r(B_2)=r$. The node Bob sends the matrix $B_1$ to the node Alice, and sends the matrix $B_2$ to the node Carol.

Step 8: After receiving the matrix $B_1$ from the Bob node, the participant Alice node internally generates a random matrix of $v_a \in \mathbb{R}^{n \times m}$ secretly, computes locally $T_a = M_a + S_a - V_a - r_a$ and $t_1 = R_a B_1$, and sends $T_a$ and $t_1$ to the Bob node.

Step 9: After receiving the matrix $B_2$ from the Bob node, the participant Carol node secretly computes $t_2 = B_2 R_c$, and sends a result $t_2$ to the Bob node.

Step 10: After receiving the matrix $T_a$ and $t_1$ sent from the Alice node and the matrix $t_2$ sent from the Carol node, the participant Bob node internally generates a random matrix $V_b \in \mathbb{R}^{n \times m}$ secretly, and secretly computes the matrix $M_b = \hat{A} \cdot R_b \cdot \hat{C}$ and $S_b = t_1 \cdot t_2 = R_a B_1 \cdot B_2 R_c = R_a \hat{B} R_c$ locally, finally obtains $T_b = T_a - M_b + S_b - V_b - r_b$, and sends it to the Carol node.

Step 11: After receiving $T_b$, the participant Carol node secretly computes and obtains a matrix $V_c = T_b - M_c + S_c - r_c$ locally.

Step 12: The participants Alice node, Bob node, and Carol node separately sends final obfuscation split results $V_a$, $V_b$, and $V_c$ corresponding to the three participants to a three-party matrix multiplication computation requestor, and the final obfuscation split results are aggregated by the three-party matrix multiplication computation requestor to obtain a final product $ABC = V_a + V_b + V_c$.

It can be readily verified that $$V_a + V_b + V_c = T_b - M_c + S_c - r_c + V_a + V_b \Rightarrow V_a + V_b + V_c =$$

$$M_a + S_a - V_a - r_a - M_b + S_b - V_b - r_b - M_c + S_c - r_c + V_a + V_b \Rightarrow$$

$$V_a + V_b + V_c = (M_a - M_b - M_c) + (S_a + S_b + S_c) - (r_a + r_b + r_c)$$

$$\text{notice:} \begin{cases} M_a = \hat{A}\hat{B}\hat{C}, & S_a = R_a R_b \hat{C} \\ M_b = \hat{A} R_b \hat{C} & S_b = R_a \hat{B} R_c \\ M_c = \hat{A} \hat{B} R_c & S_c = \hat{A} R_b R_c \end{cases}$$

$$\Rightarrow V_a + V_b + V_c =$$

$$ABC - R_a R_b C - R_a BR_c - AR_b R_c - 2R_a R_b R_c + R_a R_b \hat{C} + R_a \hat{B} R_c +$$

$$\hat{A}_{R_b R_c} - (r_a + r_b + r_c) \Rightarrow V_a + V_b + V_c =$$

$$ABC + 3R_a R_b R_c - 2R_a R_b R_c - R_a R_b R_c = ABC$$

Next, an anti-malicious mechanism of secure three-party matrix multiplication is introduced.

Generally, a secure multi-party computation problem in different privacy computing application scenarios involves a security hypothesis, including a capability of an opponent, a behavior, and a quantity of malicious nodes in a system. Only privacy computing protocols established under a corresponding security hypothesis have a meaning of security interpretability. Generally, a security behavior model is classified into a semi-honest model and a malicious model according to whether a malicious participant exists in the model. In a semi-honest model, all semi-honest or honest nodes participate in a multi-party computation protocol honestly, and strictly follow the protocol procedure to perform each step. However, some semi-honest, unilateral curious participant nodes attempt to infer raw data privacy information of other participant nodes through content obtained during a process of performing the protocol. Another passive attack behavior existing in the semi-honest model is that after a plurality of participant nodes are corrupted, information about each other is shared in a conspiracy and collusion manner to obtain data information about remaining honest participant nodes. The malicious model is a malicious participant that has an active attack in the participant node. This type of participant does not strictly follow a protocol execution procedure, and may maliciously tamper with input and output results of an intermediate computation, or even terminate the protocol. In the malicious model, the attack behavior is active. At present, under constraints of various data security laws and network security protection laws, extremely malicious attacks generally occur rarely. However, a large quantity of cryptography techniques are required for security computation under the malicious model. This also sacrifices computation efficiency and causes great communication overheads while pursuing high security. This is an uncompensated loss for some commercial acts that require no extreme confidentiality for security levels. Therefore, this solution is mainly based on a premise of the semi-honest model. An opponent evaluates and guarantees computational security of the model by using a malicious means of which a single node curiously pries into raw data or two nodes collude to infer the raw data as an analysis target.

Figure 4A:
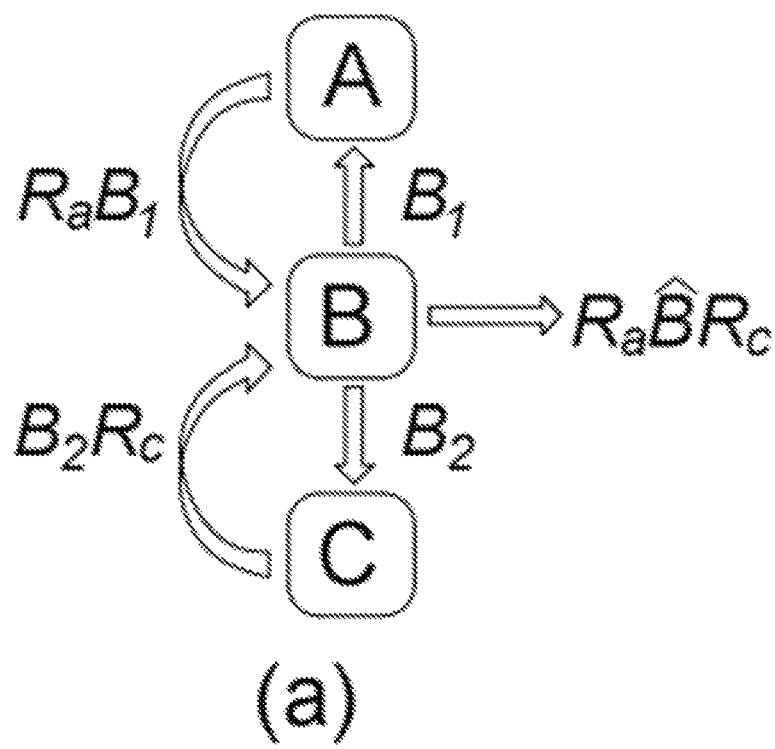
FIGS. 4A-4E are schematic diagrams of a secure three-party multiplication method corresponding to different anti-collusion solutions.
Figure 4B:
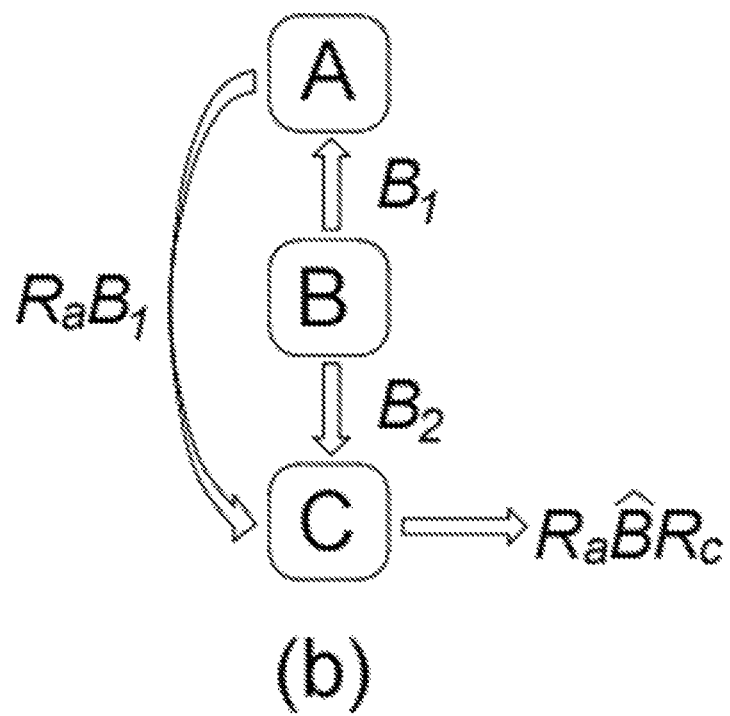
Figure 4C:
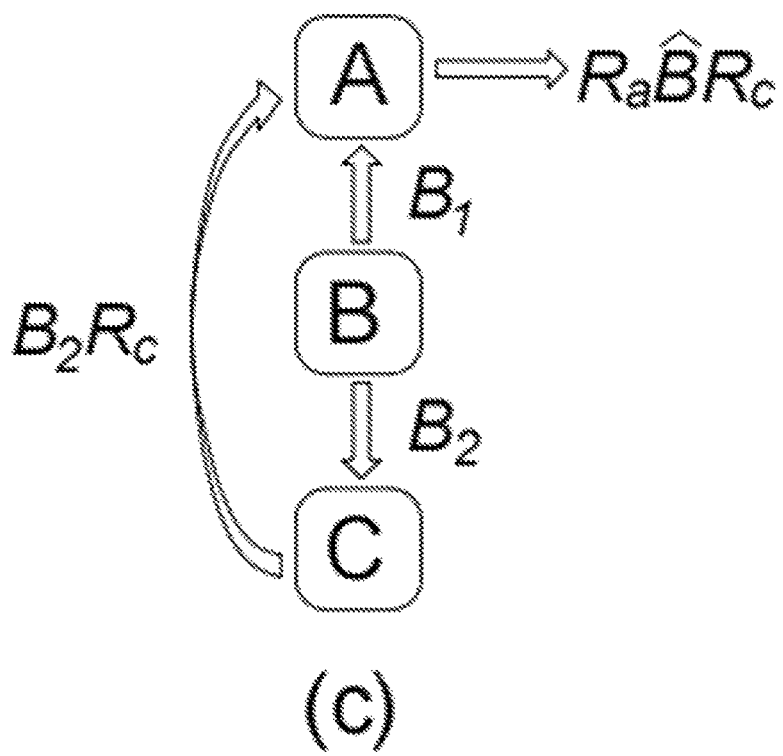
Figure 4D:
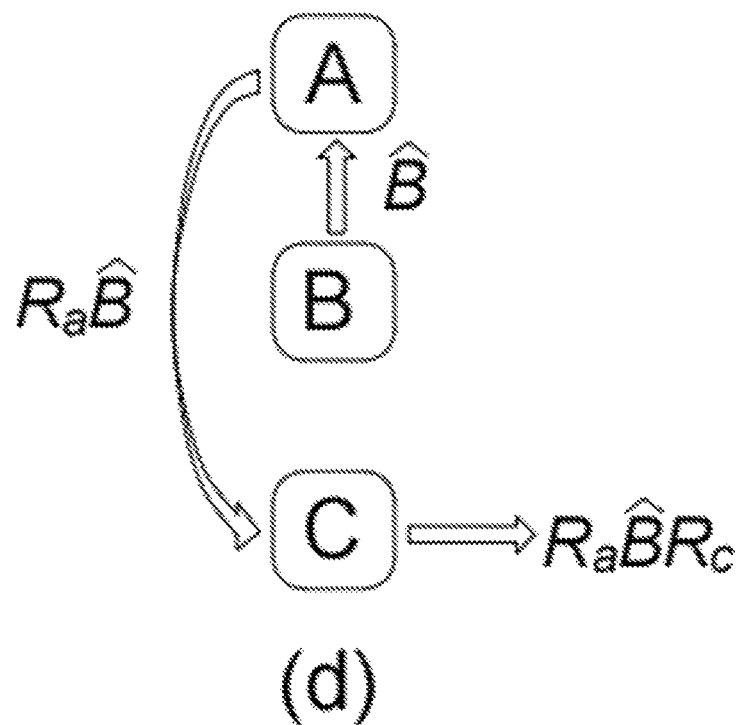
Figure 4E:
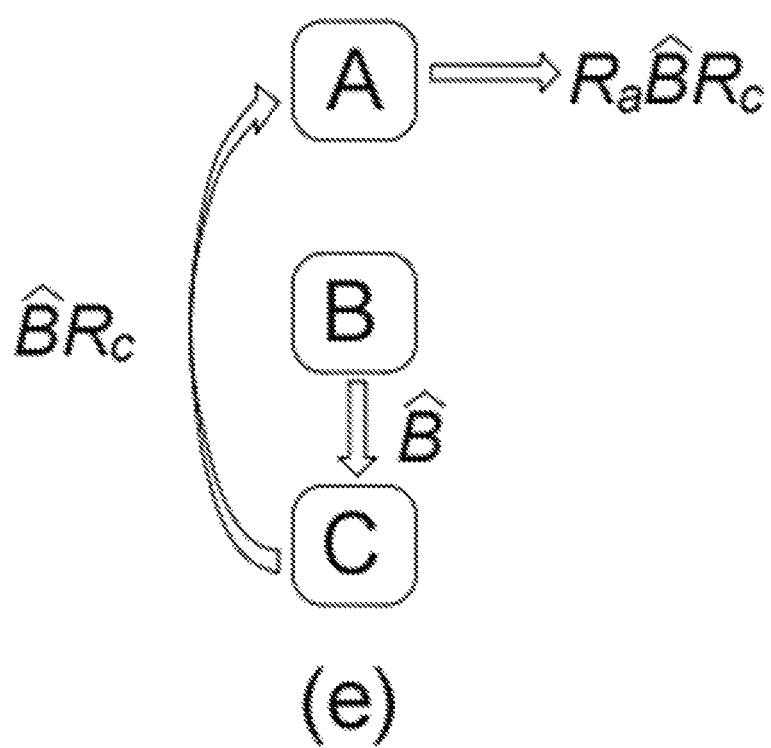

In this embodiment, in an initial phase, raw data of participant nodes have been protected by means of information encryption by means of adding random matrices provided by the CS auxiliary node in an obfuscation manner, and a final result is also split into three random result submatrices through a random obfuscation mechanism, so as to ensure security of a computational result. Therefore, a step in which a security risk exists is mainly reflected in step 7 to step 10 of interactions among three-party data of Alice, Bob, and Carol in an intermediate computational process. An ultimate purpose of these steps is to construct an effective intermediate computing component $R_a \hat{B} R_c$. Therefore, in a process of disassembling and merging the item, there is a risk of data leakage caused by a plurality of interactions of three-party intermediate results. There are five construction solutions for this item. As shown in FIGS. 4A-E, FIG. 4A represents solution 1, FIG. 4B represents solution 2a, FIG. 4C represents solution 2b, FIG. 4D represents solution 3a, and FIG. 4E represents solution 3b. The solution 2a and the solution 2b are fully equivalent, the solution 2a and the solution 2b are referred to as solution 2, the solution 3a and the solution 3b are also fully equivalent, and the solution 3a and the solution 3b are referred to as solution 3. Actually, there are three types of solutions. Therefore, only the solution a in equivalent solutions is subsequently discussed as a representative. In FIGS. 4A-E, the three participants Alice, Bob and Carol are represented by A, B and C. An idea of solution 1 is corresponding to the foregoing step 7 to step 10, a matrix $\hat{B}$ is decomposed into two submatrices $B_1$、 $B_2$ by means of full rank decomposition, and then, after being modulated by two participant nodes Alice and Carol, $R_a B_1$、 $B_2 R_c$ carrying data information of Alice and Carol are used as computation intermediate items to be jointly transferred to the participant Bob, and are aggregated by the participant Bob to obtain a final target component $R_a \hat{B} R_c$. As shown in FIGS. 4B-4C, an idea of solution 2 is different from the idea of solution 1 in that intermediate result data that is finally computed is aggregated and directed to the Carol node. However, a procedure in which the matrix $\hat{B}$ is decomposed into two submatrices $B_1$、 $B_2$ in the manner of full rank decomposition which are sent after splitting is the same as that in solution 1. As shown in FIGS. 4D-4E, an idea of solution 3 is different from the idea of solution 1 in that the Bob node does not disassemble a matrix, but directly transfers the matrix $\hat{B}$ obfuscated at an initial phase to the Alice node and finally the Carol node implements aggregation of target items, $R_a \hat{B} R_c$ and. Therefore, for the three different types of computational solutions, in this embodiment, the three solutions are compared according to an honest and curious single node and a corrupted and collusive two-node attack behavior from a perspective of computational security of a secure three-party multiplication method, and a corresponding security constraint solution is proposed.
(1) Security Analysis without Collusion When three participant compute nodes do not perform a collusion behavior in a security computation process, because the protocol is performed asynchronously and cooperatively, a step involving a security risk needs to be analyzed only to step 10. In this case, each participant node does not need to exchange a key information item involving raw data. Therefore, for solution 1, when a node performs step 10, a data item held by the participant node Alice is $\hat{A}, \hat{B}\hat{C}, R_b\hat{C}, B_1$, a data item held by the participant node Bob is $\hat{A}, \hat{B}, \hat{C}, R_aB_1, B_2R_c, B_1, B_2$, and a data item held by the participant Carol is $\hat{C}, \hat{A}\hat{B}, \hat{A}R_b, B_2$. Therefore, according to data item distribution of each node, it can be observed that due to lack of information about private matrices of Bob and Carol, it is impossible for the node Alice to infer raw data matrices B、C of Bob and Carol. Similarly, Carol cannot infer private matrix information of the other two participants. Bob may inversely infer related information of a private matrix $R_a$ involving Alice and a private matrix $R_c$ involving Carol according to held data items $R_aB_1$、$B_2R_c$ and $B_1$、$B_2$.

analysis manner, indicating that it is ensured that a single node cannot infer, according to held data item information, raw data information held by another participant in a computational process without adding a constraint condition. Similarly, for solution 3, in the foregoing analysis manner, it can be seen that due to lack of key information involving raw data items $R_a$、$R_c$ of the other two participants, the node Bob cannot infer matrix information of raw data A、C of the other two participants, and similarly, Carol cannot infer matrix information of A、B. Because Alice holds intermediate data items $\hat{B}\hat{C}$、$\hat{B}$、$R_b\hat{C}$, it needs to be prevented that after inferring $\hat{C}$ through $\hat{B}\hat{C}$、$\hat{B}$, then Alice and an intermediate item $R_b\hat{C}$ infer a private matrix B of Bob. Therefore, according to the foregoing rank constraint method, it is only required to ensure $r(\hat{B})<t$, that is, only the matrix $\hat{B}$ needs to be ensured to meet a condition of column non-full rank when a procedure in step 4 is performed. It can be learned from Table 1 that, when there is no collusion node colluding malicious behaviors, solution 2 in the three solutions of the secure three-party multiplication problem is optimal, because solution 2 has a relatively small quantity of communication rounds and does not need to introduce a rank constraint with relatively high computational overheads.
(2) Security Analysis with Collusion When there is a collusion behavior of two-party nodes in a procedure in which three participant compute nodes per-

TABLE 1

Single-node semi-honest behavior analysis table of a secure three-party multiplication method

| Technical routes | Participants | Data held by a single node | Speculation and analysis of a single party | Security constraints |
|---|---|---|---|---|
| | | | No collusion | |
| Scheme 1 | Node A | $\hat{A}, \hat{B}\hat{C}, R_b\hat{C}, B_1$ | $A \not\Rightarrow B, A \not\Rightarrow C$ | $\phi$ |
| | Node B | $\hat{A}, \hat{B}, \hat{C}, R_aB_1, B_2R_c, B_1, B_2$ | $B \Rightarrow A, B \Rightarrow C$ | $r(\hat{B}) < \min\{s, t\}$ |
| | Node C | $\hat{C}, \hat{A}\hat{B}, \hat{A}R_b, B_2$ | $C \not\Rightarrow A, C \not\Rightarrow B$ | $\phi$ |
| Scheme 2 | Node A | $\hat{A}, \hat{B}\hat{C}, R_b\hat{C}, B_1$ | $A \not\Rightarrow B, A \not\Rightarrow C$ | $\phi$ |
| | Node B | $\hat{A}, \hat{B}, \hat{C}, B_1, B_2$ | $B \not\Rightarrow A, B \not\Rightarrow C$ | $\phi$ |
| | Node C | $\hat{C}, \hat{A}\hat{B}, \hat{A}R_b, B_2, R_aB_1$ | $C \not\Rightarrow A, C \not\Rightarrow B$ | $\phi$ |
| Scheme 3 | Node A | $\hat{A}, \hat{B}\hat{C}, R_b\hat{C}, B$ | $A \Rightarrow B, A \not\Rightarrow C$ | $r(\hat{B}) < s$ |
| | Node B | $\hat{A}, \hat{B}, \hat{C}$ | $B \Rightarrow A, B \Rightarrow C$ | $\phi$ |
| | Node C | $\hat{C}, \hat{A}\hat{B}, \hat{A}R_b, R_aB$ | $C \not\Rightarrow A, C \not\Rightarrow B$ | $\phi$ |

Herein, a rank constraint method is introduced to ensure that a single node cannot reversely infer target matrix information according to a single coefficient matrix in a matrix equation. A principle thereof is that a necessary and sufficient condition of having matrices $A \in \mathbb{R}^{m \times t}$、$B \in \mathbb{R}^{m \times n}$ which make a matrix equation $AX=B$ have an infinity solution is that ranks of the matrices A、B strictly meet $r(A)=r(A:B)<t$. Similarly, a necessary and sufficient condition of a matrix equation $XA=B$ having an infinity solution is that ranks of the matrices A、B strictly meet $r(A)<m$. Therefore, in order to prevent Bob from reversely inferring $R_a$ and $R_c$ according to $R_aB_1$、$B_2R_c$ and $B_1$、$B_2$, further inferring information of primitive matrices A、C of Alice and Carol according to $\hat{A}$, $\hat{C}$, only a rank constraint condition $r(\hat{B})<\min\{s,t\}$ is required. A specific operation manner is that when $\hat{B}$ is computed in step 4, a restriction is performed, if a rank constraint condition is met, a next process can be performed, and otherwise, a generation step of a random matrix $R_b$ is re-performed until the condition is met. Similarly, for solution 2, it can be learned that a rank constraint condition of solution 2 is ø by using the foregoing form a security computation, a risk of data disclosure to the remaining participant node is further increased. Similar to the foregoing analysis manner, the analysis is still performed from step 7 to step 10, and data item information held by participant nodes Alice, Bob, and Carol in this step is sorted and arranged into a malicious behavior analysis table shown in table 2. With reference to the information shown in solution 1 in the table, it can be seen that when the computation participants Alice and Bob collude and share data, because the computation participants Alice and Bob hold an intermediate computational result $B_2R_c$ and a sub-matrix $B_1$, there is a risk of inferring a secret matrix $R_c$ held by Carol through collusion. Once $R_c$ leaks, Alice and Bob may obtain primitive matrix information of Carol according to $\hat{C}-R_c$. Therefore, a rank constraint $r(B_2)<t$ is added when step 7 is performed to ensure raw data security of Carol. Similarly, after Alice and Carol colludes, because Alice and Carol hold data items $R_b\hat{C}$、$\hat{A}R_b$ and $\hat{A}$、$\hat{C}$, there is a risk of reversely inferring $R_b$ and then inferring a secret matrix B of Bob through $\hat{B}-R_b$. Therefore, rank constraints $r(\hat{A})<s$、$r(\hat{C})<t$ needs to be added after step 2 and step 3 are performed, to perform a security check. If a rank constraint condition is met, perform an execution procedure of the following step, and otherwise, terminate and go back to the previous step, to cyclically perform. Similarly, when the participant nodes Bob and Carol collude, because the participant nodes Bob and Carol jointly hold an intermediate computation data item $R_aB_1$ and the submatrix $B_1$, there is a risk of inversely inferring a secret matrix $R_a$ of Alice by Bob and Carol. Therefore, a security check of a rank constraint $r(B_1)<s$ needs to be added after step 7 is performed. Because submatrices $B_1$、$B_2$ are obtained by means of full rank decomposition, constraints of the submatrices are equivalent to $r(\hat{B})=r(B_1)=r(B_2)<\min\{s,t\}$ with reference to the foregoing, that is, only a rank constraint $r(\hat{B})<\min\{s,t\}$ needs to be added after step 4 is performed. This is equivalent to that an obfuscated primitive matrix $\hat{B}$ is required to meet a non-full rank condition. For solution 2, the collusion of participant nodes Alice and Bob lacks a critical matrix $R_c$ involving Carol. Therefore, a secret matrix C of Carol cannot be inferred, and no constraint needs to be added. When the participants Alice and Carol collude, because the participants Alice and Carol jointly hold data items $R_b\hat{C}$、$\hat{A}R_b$ and $\hat{A}$、$\hat{C}$, there is a risk of reversely inferring $R_b$, and then inferring the secret matrix B of Bob through $\hat{B}-R_b$, and a rank constraint $r(\hat{A})<s$、$r(\hat{C})<t$ needs to be added after step 2 and step 3 are performed to perform a security check. If the rank constraint condition is met, perform an execution procedure of the following step, and otherwise, terminate and go back to the previous step to cyclically perform. When the participant nodes Bob and Carol collude, because the participant nodes Bob and Carol jointly hold an intermediate computation data item $R_aB_1$ and the submatrix $B_1$, there is a risk of inversely inferring a secret matrix $R_a$ of Alice by Bob and Carol in collusion, and a rank constraint $r(B_1)<s$ needs to be added after step 7 is performed to perform a row non-full rank security check on the matrix $B_1$. For solution 3, the collusion of the participant nodes Alice and Bob lacks the critical matrix $R_c$ involving Carol. Therefore, the secret matrix C of Carol cannot be inferred, and no constraint needs to be added. When the participants Alice and Carol collude, because the participants Alice and Carol jointly hold data items $R_b\hat{C}$、$\hat{A}R_b$ and $\hat{A}$、$\hat{C}$, there is a risk of reversely inferring $R_b$, and then inferring the secret matrix B of Bob through $\hat{B}-R_b$, and the rank constraint $r(\hat{A})<s$、$r(\hat{C})<t$ needs to be added after step 2 and step 3 are performed to perform a column non-full rank security check on a matrix $\hat{A}$ and a row non-full rank security check on a matrix $\hat{C}$. If the rank constraint condition is met, perform an execution procedure of the following step, and otherwise, terminate and go back to the previous step to cyclically perform. When the participant nodes Bob and Carol collude, because the participant nodes Bob and Carol jointly hold the intermediate computation data item $R_a\hat{B}$ and the submatrix $\hat{B}$, there is a risk of inversely inferring the secret matrix $R_a$ of Alice by Bob and Carol in collusion, and the rank constraint $r(\hat{B})<s$ needs to be added after step 7 is performed to perform a row non-full rank security check on the matrix $\hat{B}$.

TABLE 2

Two-node in collusion malicious behavior analysis table of a secure three-party multiplication method

| Technical routes | Participants | With collusion ||| 
| | | Data held by a collusion node | Collusion risk analysis | Security constraints |
| --- | --- | --- | --- | --- |
| Scheme 1 | Node A | $\psi(A,B): \hat{A}, \hat{B}, \hat{C}, \hat{B}\hat{C},$ $R_aB_1, B_2R_c, B_1, B_2$ | $\psi(A, B) \Rightarrow C:$ $\{B_2R_c \Rightarrow R_c|B_1, \hat{C}]$ | $r(B_2) < t$ |
| | Node B | $\psi(A, C): \hat{A}, \hat{C}, \hat{B}\hat{C}, R_b$ $\hat{A}\hat{B}, \hat{A}R_b, B_1, B_2$ | $\psi(A, C) \Rightarrow B:$ $\{R_b\hat{C} \Rightarrow R_b, \hat{A}R_b \Rightarrow R_b|\hat{A}, \hat{C}\}$ | $r(\hat{A}) < s,$ $r(\hat{C}) < t$ |
| | Node C | $\psi(B,C): \hat{B}, \hat{C}, \hat{A}\hat{B}, \hat{A}R$ $R_aB_1, B_2R_c, B_1, B_2$ | $\psi(B, C) \Rightarrow A:$ $\{R_aB_1 \Rightarrow R_a|B_1\}$ | $r(B_1) < s$ |
| Scheme 2 | Node A | $\psi(A,B): \hat{A}, \hat{B}, \hat{C}, \hat{B}\hat{C},$ $R_b\hat{C}, R_aB_1, B_2R_c, B_1,$ | $\psi(A, B) \not\Rightarrow C$ | $\phi$ |
| | Node B | $\psi(A, C): \hat{A}, \hat{C}, \hat{B}\hat{C},$ $R_b\hat{C}, \hat{A}\hat{B}, \hat{A}R_b, R_aB_1$ | $\psi(A, C) \Rightarrow B:$ $\{R_b\hat{C} \Rightarrow R_b, \hat{A}R_b \Rightarrow R_b|\hat{A}, \hat{C}\}$ | $r(\hat{A}) < s,$ $r(\hat{C}) < t$ |
| | Node C | $\psi(B,C): \hat{A}, \hat{B}, \hat{C}, \hat{A}\hat{B},$ $\hat{A}R_b, R_aB_1, B_1, B_2$ | $\psi(B, C) \Rightarrow A:$ $\{R_aB_1 \Rightarrow R_a|B_1\}$ | $r(B_1) < s$ |
| Scheme 3 | Node A | $\psi(A,B): \hat{A}, \hat{B}, \hat{C}, \hat{B}\hat{C},$ $R_b\hat{C}$ | $\psi(A, B) \not\Rightarrow C$ | $\phi$ |
| | Node B | $\psi(A, C): \hat{A}, \hat{B}, \hat{C}, \hat{B}\hat{C},$ $R_b\hat{C}, \hat{A}\hat{B}, \hat{A}R_b, R_a\hat{B}$ | $\psi(A, C) \Rightarrow B:$ $\{R_b\hat{C} \Rightarrow R_b, \hat{A}R_b \Rightarrow R_b|\hat{A}, \hat{C}\}$ | $r(\hat{A}) < s,$ $r(\hat{C}) < t$ |
| | Node C | $\psi(B,C): \hat{A}, \hat{B}, \hat{C}, \hat{A}\hat{B},$ $\hat{A}R, R_a\hat{B}$ | $\psi(B, C) \Rightarrow A:$ $\{R_a\hat{B} \Rightarrow R_a|\hat{B}\}$ | $r(\hat{B}) < s$ |

The foregoing embodiments have the following technical effects:

An essential difference among three types of technical solutions lies in different splitting and merging execution methods are used about constructing an intermediate data item $R_a\hat{B}R_c$, and a specific execution procedure thereof is embodied in step 7 to step 11 in a secure three-party matrix multiplication procedure. More specifically, a specific execution procedure of solution 1 is as follows:

Step 7: The participant Bob node internally splits the matrix $\hat{B}$ by means of full rank decomposition, and two submatrices obtained after decomposition are a column full rank matrix $B_1 \in \mathbb{R}^{s \times r}$ and a row full rank matrix $B_2 \in \mathbb{R}^{r \times t}$, where ranks of a non-zero matrix $\hat{B}$ and split matrices $B_1$、$B_2$ meet a constraint condition $r(\hat{B})=r(B_1)=r(B_2)=r$. The node Bob sends the matrix $B_1$ to the node Alice, and sends the matrix $B_2$ to the node Carol.

Step 8: After receiving the matrix $B_1$ from the Bob node, the participant Alice node internally generates a random matrix of $V_a \in \mathbb{R}^{n \times m}$ secretly, computes locally $T_a=M_a+S_a-V_a-r_a$ and $t_1=R_aB_1$, and sends $T_a$ and $t_1$ to the Bob node.

Step 9: After receiving the matrix $B_2$ from the Bob node, the participant Carol node secretly computes $t_2=B_2R_c$, and sends a result $t_2$ to the Bob node.

Step 10: After receiving the matrix $T_a$ and $t_1$ sent from the Alice node and the matrix $t_2$ sent from the Carol node, the participant Bob node internally generates a random matrix $V_b \in \mathbb{R}^{n \times m}$ secretly, and secretly computes the matrix $M_b = \hat{A} \cdot R_b \cdot \hat{C}$ and $S_b = t_1 \cdot t_2 = R_a B_1 \cdot B_2 R_c = R_a \hat{B} R_c$ locally, finally obtains $T_b = T_a - M_b + S_b - V_b - r_b$, and sends it to the Carol node.

Step 11: After receiving $T_b$, the participant Carol node secretly computes and obtains a matrix $V_c = T_b - M_c + S_c - r_c$ locally.

Technical means and effects of solution 1 are as follows:

In solution 1, obfuscated primitive matrices $\hat{A}$、$\hat{B}$、$\hat{C}$ are checked first to determine whether the primitive matrices meet rank constraints $r(\hat{A}) \leq s$、$r(\hat{B}) \leq \min\{s,t\}$、$r(\hat{C}) \leq t$, that is, it is required that matrices $\hat{A}$、$\hat{C}$ meet a row non-full rank condition and the matrix $\hat{B}$ meets a non-full rank condition before decomposition. After the condition constraint is met, the matrix $\hat{B}$ is decomposed into two submatrices $B_1$、$B_2$ by means of full rank decomposition, and then, after being modulated by two participant nodes Alice and Carol, $R_a B_1$、$B_2 R_c$ carrying data information of Alice and Carol are used as computation intermediate items to be jointly transferred to the participant Bob, and are aggregated by the participant Bob to obtain a final target component $R_a \hat{B} R_c$. Because a rank constraint is added before the solution is performed, raw data information of another third participant cannot be inferred even if two-party nodes collude to share data information in a computational process. This is because when a rank constraint condition is met, solution space is an infinite set, so that real information of raw data can be effectively protected. In addition, because the constraint condition is a strong constraint and meets a constraint condition that a single node cannot inversely infer raw data information of another participant in a case of no collusion, solution 1 that meets the constraint can ensure security of a model against passive attack regardless of whether a collusion node exists. From a perspective of an application scenario, because the constraint condition may be checked before matrix decomposition, the solution is more suitable for a scenario in which a security requirement is relatively high from a perspective of higher prior security and easier to add a constraint operation.

A specific execution procedure of solution 2a or 2b is as follows:

Step 7: The participant Bob node internally splits the matrix $\hat{B}$ by means of full rank decomposition, and two submatrices obtained after decomposition are a column full rank matrix $B_1 \in \mathbb{R}^{s \times r}$ and a row full rank matrix $B_2 \in \mathbb{R}^{r \times t}$, where ranks of a non-zero matrix $\hat{B}$ and split matrices $B_1$、$B_2$ meet a constraint condition $r(\hat{B}) = r(B_1) = r(B_2) = r$. The node Bob sends the matrix $B_1$ to the node Alice, and sends the matrix $B_2$ to the node Carol.

Step 8: After receiving the matrix $B_1$ from the Bob node, the participant Alice node internally generates a random matrix of $V_a \in \mathbb{R}^{n \times m}$ secretly, computes locally $T_a = M_a + S_a - V_a - r_a$ and $t_1 = R_a B_1$, sends $T_a$ to the node Bob and sends $t_1$ to the node Carol.

Step 9: After receiving the matrix $B_2$ from the Bob node, the participant Carol node secretly computes $t_2 = B_2 R_c$.

Step 10: After receiving the matrix $T_a$ sent from the Alice node, the participant Bob node internally generates a random matrix $V_b \in \mathbb{R}^{n \times m}$ secretly, secretly computes a matrix $M_b = \hat{A} \cdot R_b \cdot \hat{C}$ locally, finally obtains $T_b = T_a - M_b - V_b - r_b$, and sends it to the Carol node.

Step 11: After receiving the matrix $t_1$ sent from the Alice node and the matrix $T_b$ sent from the Bob node, the participant Carol node secretly computes $S_b = t_1 \cdot t_2 = R_a B_1 \cdot B_2 R_c = R_a \hat{B} R_c$ and the matrix $V_c = T_b + S_b - M_c + S_c - r_c$ locally.

Technical means and effects of solution 2a or 2b are as follows:

In solution 2, a matrix $\hat{B}$ is decomposed into two submatrices $B_1$、$B_2$ by means of full rank decomposition, and then, after being modulated by two participant nodes Alice and Carol, $R_a B_1$ carrying data information of Alice is used as a computation intermediate item to be jointly transferred to the participant Carol, and are aggregated by the participant Carol to obtain a final target component $R_a \hat{B} R_c$. In this solution, when there is no collusion behavior, there is no need to add any rank constraint, and security can be ensured because raw data information of another participant cannot be inversely inferred by a single node according to an intermediate computational result. Therefore, when a security requirement is relatively low and a trusted execution environment is involved, this solution can be adopted to ensure computational security in a case of no collusion.

However, for a scenario in which collusion exists, a constraint condition similar to that in solution 1 needs to be adopted, and obfuscated primitive matrices $\hat{A}$、$\hat{C}$ need to be checked first to determine whether the primitive matrices meet rank constraint $r(\hat{A}) \leq s$、$r(\hat{C}) \leq t$, that is, it is required that the matrices $\hat{A}$、$\hat{C}$ meet a row non-full rank condition before decomposition. After the condition constraint is met, the matrix $\hat{B}$ is decomposed into two submatrices $B_1$、$B_2$ by means of full rank decomposition. However, different from solution 1, a posterior rank constraint needs to be performed in solution 2. When the decomposed submatrix $B_1$ meets a rank constraint condition $r(B_1) \leq s$, step 7 is allowed to continue, or step 7 is not allowed to continue until the decomposition meets this condition.

A specific execution procedure of solution 3a or 3b is as follows:

Step 7: The participant Bob node sends the matrix $\hat{B}$ to the node Alice.

Step 8: After receiving the matrix $\hat{B}$ from the Bob node, the participant Alice node internally generates a random matrix of $V_a \in \mathbb{R}^{n \times m}$ secretly, computes locally $T_a = M_a + S_a - V_a - r_a$ and $t_1 = R_a \hat{B}$, sends $T_a$ to the node Bob and sends t to the node Carol.

Step 9: After receiving the matrix t from the Alice node, the participant Carol node secretly computes $S_b = t \cdot R_c = R_a \hat{B} R_c$.

Step 10: After receiving the matrix $T_a$ sent from the Alice node, the participant Bob node internally generates a random matrix $V_b \in \mathbb{R}^{n \times m}$ secretly, secretly computes a matrix $M_b = \hat{A} \cdot R_b \cdot \hat{C}$ locally, finally obtains $T_b = T_a - M_b - V_b - r_b$, and sends it to the Carol node.

Step 11: After receiving the matrix $T_b$ sent from the Bob node, the participant Carol node secretly computes the matrix $V_c = T_b + S_b - M_c + S_c - r_c$ locally.

Technical means and effects of solution 3a or 3b are as follows:

In solution 1, obfuscated primitive matrices $\hat{A}$、$\hat{B}$、$\hat{C}$ are checked first to determine whether the primitive matrices meet rank constraints $r(\hat{A}) \leq s$、$r(\hat{B}) \leq s$、$r(\hat{C}) \leq t$, that is, it is required that matrices $\hat{A}$、$\hat{B}$、$\hat{C}$ meet a row non-full rank condition before decomposition. After the condition constraint is met, the matrix $\hat{B}$ is not decomposed, and directly transfers $R_a \hat{B}$ carrying data information of Alice used as a computation intermediate item to the participant Carol, and are aggregated by the participant Carol to obtain a final target component $R_a \hat{B} R_c$. Because a rank constraint is added before the solution is performed, raw data information of another third participant cannot be inferred even if two-party nodes collude to share data information in a computational process. This is because when a rank constraint condition is met, solution space is an infinite set, so that real information of raw data can be effectively protected. In addition, because the constraint condition is a strong constraint and meets a constraint condition that a single node cannot inversely infer raw data information of another participant in a case of no collusion, solution 3 that meets the constraint can ensure security of a model against passive attack regardless of whether a collusion node exists. From a perspective of an application scenario, because the constraint condition may be checked before matrix decomposition, and a quantity of communication rounds in an entire procedure is less than the other two solutions, the solution is more suitable for a scenario in which a security requirement is relatively high and a computing resource is relatively limited from a perspective of higher prior security and lower communication overheads.

In any one of the foregoing solutions, there are many practical scenarios for specific application. Herein, a financial industry is used as an example for description. It is assumed that three financial institutions Alice, Bob, and Carol exist, where an Alice organization has a private matrix A with a dimension of n×m1, n indicates that the bank has n customer samples, and m1 indicates that these samples involve m1 characteristic attributes of the customer (for example, parameters related to revenue and tax). A Bob organization has a private matrix B with a dimension of n×m2, where n indicates that the bank has n customer samples, and m2 indicates that these samples involve m2 characteristic attributes of the customer (for example, parameters related to liabilities and mortgage loans). A Carol organization has a private matrix C with a dimension of n×m3, where n indicates that the bank has n customer samples, and m3 indicates that these samples involve m3 label attributes of the customer (for example, whether the user is a blacklisted user or whether the user is a high-level customer of the bank). In this case, the superior financial control regulator of three financial organizations hopes to implement joint modeling of the three-party privacy data matrix without exposing respective private customer information of three financial subsidiary companies to each other, to classify loan levels of user groups. The modeling result is obtained by the financial control supervisors of the requestor, and only local model parameter information is obtained by the three participant subsidiary companies. In this computational process, the private matrices A, B, and C that participate in the computation may generate a three-party matrix multiplication A×B×C computation problem in a joint modeling process. This method is used to implement security computation of the process. Without disclosing each other's information, three sub-financial institutions obtain a parameter matrix of local output results $V_a$, $V_b$, and $V_c$ of joint modeling. When three parameter matrices are transferred to the superior financial control regulator, complete output result information of joint modeling model parameters may be obtained by adding the three parameter matrices.

This embodiment proposes a constraint method for effectively preventing a malicious behavior of which a single-node is curious to inversely infer raw matrix data information of remaining computation participants based on a semi-honest model; proposes a constraint method for effectively preventing a malicious behavior in which after secure three-party multiplication computation is completed, two nodes collude to inversely infer primitive matrix data information of remaining participants based on a semi-honest model, and proposes a set of anti-collusion constraint solutions for secure three-party matrix multiplication computation under different security requirements and computing resource conditions.

The method proposed in this embodiment eliminates a risk of node collusion faced by the conventional technology, such as a secret sharing solution in a semi-honest model with fewer participants (for example, three parties). At the same time, a multi-party security computation problem related to a limitation of three paradox of model security, availability, and low overheads proposes an alternative solution facing different scenarios. Specifically: (1) In a computational process, a security problem in which an existing secure multi-party matrix multiplication technology based on a semi-honest model hypothesis how to effectively ensure that raw participant matrix data cannot be inversely inferred by a curious and semi-honest participant node is solved. (2) A security problem in which an existing secure multi-party matrix multiplication technology how to effectively prevent participant nodes cause raw data leakage due to a corrupted and collusive behavior based on the semi-honest model hypothesis, after computation is completed is solved. (3) An optimal implementation solution in different scenario requirements is proposed to solve constraints of which the existing secure multi-party matrix multiplication technology based on the semi-honest model hypothesis cannot balance three indexes security, availability and low overheads related to model performance.

The present disclosure further provides an electronic device, including a memory and a processor, where the memory is configured to store a computer program, and the processor runs the computer program to enable the electronic device to perform the foregoing the anti-malicious method for secure three-party computation.

The present disclosure further provides a computer-readable storage medium. The computer-readable storage medium stores a computer program, where the computer program is executed by a processor to implement the anti-malicious method for secure three-party computation.

Each embodiment of the present specification is described in a progressive manner, each embodiment focuses on the difference from other embodiments, and the same and similar parts between the embodiments may refer to each other.

Specific examples are used herein to explain the principles and embodiments of the present disclosure. The foregoing description of the embodiments is merely intended to help understand the method of the present disclosure and its core ideas; besides, various modifications may be made by those of ordinary skill in the art to specific embodiments and the scope of application in accordance with the ideas of the present disclosure. In conclusion, the content of the present specification shall not be construed as limitations to the present disclosure.

What is claimed is:

1. An anti-malicious computer implemented method for secure three-party computation, wherein the method is being implemented by a computer processor to perform steps comprising:

determining a first private data matrix, a second private data matrix, and a third private data matrix, wherein the first private data matrix is in n×s dimensions, held by a first participant, and stored in a first compute node associated with the first participant, the second private data matrix is in s×t dimensions, held by a second participant, and stored in a second compute node associated with the second participant, and the third private data matrix is in t×m dimensions, held by a third participant, and stored in a third compute node associated with the third participant;

receiving, by the first participant, a first random matrix pair generated by a commodity server node, wherein the first random matrix pair comprises a first random matrix in the n×s dimensions and a second random matrix in n×m dimensions;

receiving, by the second participant, a second random matrix pair generated by the commodity server node, wherein the second random matrix pair comprises a third random matrix in the s×t dimensions and a fourth random matrix in the n×m dimensions;

receiving, by the third participant, a third random matrix pair generated by the commodity server node, wherein the third random matrix pair comprises a fifth random matrix in the t×m dimensions and a sixth random matrix in the n×m dimensions;

determining whether a collusion behavior exists when the first participant, the second participant, and the third participant perform a secure computation process;

if no collusion behavior exists, performing a first computational process that meets a first security constraint, a second computational process without a security constraint, or a third computational process that meets a second security constraint, to obtain a first output matrix output by the first participant, a second output matrix output by the second participant, and a third output matrix output by the third participant;

if the collusion behavior exists, performing a first computational process that meets a third security constraint, a second computational process that meets a fourth security constraint, or a third computational process that meets a fifth security constraint, to obtain a first output matrix output by the first participant, a second output matrix output by the second participant, and a third output matrix output by the third participant;

obtaining, by a computation requestor, the first output matrix, the second output matrix, and the third output matrix, and performing an operation on the first output matrix, the second output matrix, and the third output matrix according to a target requirement;

the first computational process comprising:

computing, by the first participant, a first internal matrix according to a formula $\hat{A}=A+R_a$, and sending the first internal matrix to the second participant, wherein $\hat{A}$ represents the first internal matrix, A represents the first private data matrix, and Ra represents the first random matrix;

computing, by the third participant, a third internal matrix according to a formula $\hat{C}=C+R_c$, and sending the third internal matrix to the second participant, wherein $\hat{C}$ represents the third internal matrix, C represents the third private data matrix, and $R_c$ represents the fifth random matrix;

computing, by the second participant, a second internal matrix, a second M matrix, a first intermediate term matrix, a second intermediate term matrix, a third intermediate term matrix, and a fourth intermediate term matrix according to formulas $\hat{B}=B+B_b$, $M_b=\hat{A} \cdot R_b \cdot \hat{C}$, $\varphi_1=\hat{A} \cdot B$, $\gamma_1=\hat{A} \cdot R_b$, $\varphi_2=\hat{B} \cdot \hat{C}$ and $\gamma_2=R_b \cdot \hat{C}$, sending the third intermediate term matrix and the fourth intermediate term matrix to the first participant, and sending the first intermediate term matrix and the second intermediate term matrix to the third participant, wherein $\hat{B}$ represents the second internal matrix, $M_b$ represents the second M matrix, $\varphi_1$ represents the first intermediate term matrix, $\gamma_1$ represents the second intermediate term matrix, $\varphi_2$ represents the third intermediate term matrix, $\gamma_2$ represents the fourth intermediate term matrix, B represents the second private data matrix, and $R_b$ represents the third random matrix;

computing, by the first participant, a first S matrix and a first M matrix according to formulas $S_a=R_a \cdot \gamma_2=R_a \cdot R_b \hat{C}$ and $M_a=\varphi_2=\hat{A} \cdot \hat{B} \cdot \hat{C}$, wherein $S_a$ represents the first S matrix, and $M_a$ represents the first M matrix;

computing, by the third participant, a third S matrix and a third M matrix according to formulas $S_c=\gamma_1 \cdot R_c=\hat{A} R_b \cdot R_c$ and $M_c=\varphi_1 \cdot R_c=\hat{A} \cdot \hat{B} \cdot R_c$, wherein $S_c$ represents the third S matrix, and $M_c$ represents the third M matrix;

splitting, by the second participant, the second internal matrix into a column full rank matrix and a row full rank matrix by means of full rank decomposition, sending the column full rank matrix to the first participant, and sending the row full rank matrix to the third participant;

generating, by the first participant, a first output matrix based on the column full rank matrix, computing a first T matrix and a first t matrix according to formulas $T_a=M_a+S_a-V_a-r_a$ and $t_1=R_a B_1$, and sending the first T matrix and the first t matrix to the second participant, wherein $T_a$ represents the first T matrix, $t_1$ represents the first t matrix, $V_a$ represents the first output matrix, $r_a$ represents the second random matrix, $B_1$ represents the column full rank matrix, and a space in which $B_1$ belongs to is in s×r dimensions;

computing, by the third participant, a second t matrix according to a formula $t_2=B_2 R_c$, and sending the second t matrix to the second participant, wherein $t_2$ represents the second t matrix, $B_2$ represents the row full rank matrix, and a space in which $B_2$ belongs to is in r×t dimensions;

generating, by the second participant, a second output matrix based on the first T matrix, the first t matrix, and the second t matrix, computing a second S matrix according to a formula $S_b=t_1 \cdot t_2=R_a B_1 \cdot B_2 R_c=R_a \hat{B} R_c$, computing a second T matrix through a formula $T_b=T_a-M_b+S_b-V_b-r_b$ according to the second S matrix, and sending the second T matrix to the third participant, wherein $S_b$ represents the second S matrix, Tb represents the second T matrix, $V_b$ represents the second output matrix, and $R_b$ represents the fourth random matrix; and computing, by the third participant, a third output matrix according to a formula $V_c=T_b-M_c+S_c-r_c$, wherein $V_c$ represents the third output matrix, and $r_c$ represents the sixth random matrix;

the second computational process comprising:

computing, by the first participant, a first internal matrix according to a formula $\hat{A}=A+R_a$, and sending the first internal matrix to the second participant;

computing, by the third participant, a third internal matrix according to a formula $\hat{C}=C+R_c$, and sending the third internal matrix to the second participant;

computing, by the second participant, a second internal matrix, a second M matrix, a first intermediate term matrix, a second intermediate term matrix, a third intermediate term matrix, and a fourth intermediate term matrix according to formulas $\hat{B}=B+B_b$, $M_b=\hat{A} \cdot R_b \cdot \hat{C}$, $\varphi_1=\hat{A} \cdot \hat{B}$, $\gamma_1=\hat{A} \cdot R_b$, $\varphi_2=\hat{B} \cdot \hat{C}$ and $\gamma_2=R_b \cdot \hat{C}$, sending the third intermediate term matrix and the fourth intermediate term matrix to the first participant, and sending the first intermediate term matrix and the second intermediate term matrix to the third participant;

computing, by the first participant, a first S matrix and a first M matrix according to formulas $S_a=R_a\cdot\gamma_2=R_a\cdot R_b\hat{C}$ and $M_a=A\cdot\varphi_2=A\cdot\hat{B}\cdot\hat{C}$;

computing, by the third participant, a third S matrix and a third M matrix according to formulas $S_c=\gamma_1\cdot R_c=\hat{A}R_b\cdot R_c$ and $M_c=\varphi_1\cdot R_c=\hat{A}\cdot\hat{B}\cdot R_c$;

splitting, by the second participant, the second internal matrix into a column full rank matrix and a row full rank matrix by means of full rank decomposition, sending the column full rank matrix to the first participant, and sending the row full rank matrix to the third participant;

generating, by the first participant, a first output matrix based on the column full rank matrix, computing a first T matrix and a first t matrix according to formulas $T_a=M_a+S_a-V_a-␣r_a$ and $t_1=R_aB_1$, sending the first T matrix to the second participant, and sending the first t matrix to the third participant;

computing, by the third participant, a second t matrix according to a formula $t_2=B_2R_c$;

generating, by the second participant, a second output matrix based on the first T matrix, computing a second T matrix according to a formula $T_b=T_a-M_b-V_b-r_b$, and sending the second T matrix to the third participant;

computing, by the third participant, a second S matrix according to the formula $S_b=t_1\cdot t_2=R_aB_1\cdot B_2R_c=R_a\hat{B}R_c$, and computing a third output matrix through a formula $V_c=T_b+S_b-M_c+S_c-r_c$, according to the second S matrix and the second T matrix;

the third computational process comprising:

computing, by the first participant, a first internal matrix according to a formula $\hat{A}=A+R_a$, and sending the first internal matrix to the second participant;

computing, by the third participant, a third internal matrix according to a formula $\hat{C}=C+R_c$, and sending the third internal matrix to the second participant;

computing, by the second participant, a second internal matrix, a second M matrix, a first intermediate term matrix, a second intermediate term matrix, a third intermediate term matrix, and a fourth intermediate term matrix according to formulas $\hat{B}=B+B_b$, $M_b=\hat{A}\cdot R_b\cdot\hat{C}$, $\varphi_1=\hat{A}\cdot\hat{B}$, $\gamma_1=\hat{A}\cdot R_b$, $\varphi_2=\hat{B}\cdot\hat{C}$ and $\gamma_2=R_b\cdot\hat{C}$, sending the third intermediate term matrix and the fourth intermediate term matrix to the first participant, and sending the first intermediate term matrix and the second intermediate term matrix to the third participant;

computing, by the first participant, a first S matrix and a first M matrix according to formulas $S_a=R_a\cdot\gamma_2=R_a\cdot R_b\hat{C}$ and $M_a=A\cdot\varphi_2=A\cdot\hat{B}\cdot\hat{C}$;

computing, by the third participant, a third S matrix and a third M matrix according to formulas $S_c=\gamma_1\cdot R_c=\hat{A}R_b\cdot R_c$ and $M_c=\varphi_1\cdot R_c=\hat{A}\cdot\hat{B}\cdot R_c$;

sending, by the second participant, the second internal matrix to the first participant;

generating, by the first participant, a first output matrix based on the second internal matrix, computing a first T matrix and a first t matrix according to formulas $T_a=M_a+S_a-V_a-r_a$ and $t_1=R_a\hat{B}$, sending the first T matrix to the second participant, and sending the first t matrix to the third participant;

computing, by the third participant, a second S matrix according to a formula $S_b=t\cdot R_c=R_a\hat{B}R_c$;

generating, by the second participant, a second output matrix based on the first T matrix, computing a second T matrix according to a formula $T_b=T_a-M_b-V_b-r_b$, and sending the second T matrix to the third participant; and computing, by the third participant, a third output matrix according to a formula $V_c=T_b+S_b-M_c+S_c-r_c$, wherein the first security constraint is $r(\hat{B})<\min\{s,t\}$, the second security constraint is $r(\hat{B})<s$, the third security constraint is $r(\hat{A})<s$, $r(\hat{B})<\min\{s,t\}$ and $r(\hat{C})<t$, the fourth security constraint is $r(\hat{A})<s$, $r(\hat{C})<t$ and $r(B_1)<s$, the fifth security constraint is $r(\hat{A})<s$, $r(\hat{B})<s$ and $r(\hat{C})<t$, and $r(\ )$ represents a rank of a matrix.

2. The anti-malicious computer implemented method for secure three-party computation according to claim 1, wherein the performing, by the computation requestor, an operation on the first output matrix, the second output matrix, and the third output matrix according to the target requirement specifically comprises:

if the target requirement of the computation requestor is computing a product of a three-party matrix, determining a sum value of the first output matrix, the second output matrix, and the third output matrix as a product of the three-party matrix; or a product of the three-party matrix is a product of the first private data matrix, the second private data matrix, and the third private data matrix.

3. The anti-malicious computer implemented method for secure three-party computation according to claim 1, wherein a sum of the second random matrix, the fourth random matrix, and the sixth random matrix is equal to a product of the first random matrix, the third random matrix, and the fifth random matrix.

4. The anti-malicious computer implemented method for secure three-party computation according to claim 1, wherein the column full rank matrix and the row full rank matrix meet a constraint condition $r(\hat{B})=r(B_1)=r(B_2)=r$.

5. An electronic device, comprising a memory and a processor, wherein the memory is configured to store a computer program, and the processor runs the computer program, to enable the electronic device to perform the anti-malicious method for a secure three-party computation, wherein the method comprising:

determining a first private data matrix, a second private data matrix, and a third private data matrix, wherein the first private data matrix is in n×s dimensions, held by a first participant, and stored in a first compute node associated with the first participant, the second private data matrix is in s×t dimensions, held by a second participant, and stored in a second compute node associated with the second participant, and the third private data matrix is in t×m dimensions, held by a third participant, and stored in a third compute node associated with the third participant;

receiving, by the first participant, a first random matrix pair generated by a commodity server node, wherein the first random matrix pair comprises a first random matrix in the n×s dimensions and a second random matrix in n×m dimensions;

receiving, by the second participant, a second random matrix pair generated by the commodity server node, wherein the second random matrix pair comprises a third random matrix in the s×t dimensions and a fourth random matrix in the n×m dimensions;

receiving, by the third participant, a third random matrix pair generated by the commodity server node, wherein the third random matrix pair comprises a fifth random matrix in the t×m dimensions and a sixth random matrix in the n×m dimensions;

determining whether a collusion behavior exists when the first participant, the second participant, and the third participant perform a secure computation process;

if no collusion behavior exists, performing a first computational process that meets a first security constraint, a second computational process without a security constraint, or a third computational process that meets a second security constraint, to obtain a first output matrix output by the first participant, a second output matrix output by the second participant, and a third output matrix output by the third participant;

if the collusion behavior exists, performing a first computational process that meets a third security constraint, a second computational process that meets a fourth security constraint, or a third computational process that meets a fifth security constraint, to obtain a first output matrix output by the first participant, a second output matrix output by the second participant, and a third output matrix output by the third participant;

obtaining, by a computation requestor, the first output matrix, the second output matrix, and the third output matrix, and performing an operation on the first output matrix, the second output matrix, and the third output matrix according to a target requirement;

the first computational process comprising:

computing, by the first participant, a first internal matrix according to a formula $\hat{A}=A+R_a$, and sending the first internal matrix to the second participant, wherein $\hat{A}$ represents the first internal matrix, A represents the first private data matrix, and Ra represents the first random matrix;

computing, by the third participant, a third internal matrix according to a formula $\hat{C}=C+R_c$, and sending the third internal matrix to the second participant, wherein $\hat{C}$ represents the third internal matrix, C represents the third private data matrix, and $R_c$ represents the fifth random matrix;

computing, by the second participant, a second internal matrix, a second M matrix, a first intermediate term matrix, a second intermediate term matrix, a third intermediate term matrix, and a fourth intermediate term matrix according to formulas $\hat{B}=B+B_b$, $M_b=\hat{A} \cdot R_b \cdot \hat{C}$, $\varphi_1=\hat{A} \cdot \hat{B}$, $\gamma_1=\hat{A} \cdot R_b$, $\varphi_2=\hat{B} \cdot \hat{C}$ and $\gamma_2=R_b \cdot \hat{C}$, sending the third intermediate term matrix and the fourth intermediate term matrix to the first participant, and sending the first intermediate term matrix and the second intermediate term matrix to the third participant, wherein $\hat{B}$ represents the second internal matrix, $M_b$ represents the second M matrix, $\varphi_1$ represents the first intermediate term matrix, $\gamma_1$ represents the second intermediate term matrix, $\varphi_2$ represents the third intermediate term matrix, $\gamma_2$ represents the fourth intermediate term matrix, B represents the second private data matrix, and $R_b$ represents the third random matrix;

computing, by the first participant, a first S matrix and a first M matrix according to formulas $S_a=R_a \cdot \gamma_2=R_a \cdot R_b \hat{C}$ and $M_a=A \cdot \varphi_2=A \cdot \hat{B} \cdot \hat{C}$, wherein $S_a$ represents the first S matrix, and $M_a$ represents the first M matrix;

computing, by the third participant, a third S matrix and a third M matrix according to formulas $S_c=\gamma_1 \cdot R_c=\hat{A} R_b \cdot R_c$ and $M_c=\varphi_1 \cdot R_c=\hat{A} \cdot \hat{B} \cdot R_c$, wherein $S_c$ represents the third S matrix, and $M_c$ represents the third M matrix;

splitting, by the second participant, the second internal matrix into a column full rank matrix and a row full rank matrix by means of full rank decomposition, sending the column full rank matrix to the first participant, and sending the row full rank matrix to the third participant;

generating, by the first participant, a first output matrix based on the column full rank matrix, computing a first T matrix and a first t matrix according to formulas $T_a=M_a+S_a-V_a-r_a$ and $t_1=R_a B_1$, and sending the first T matrix and the first t matrix to the second participant, wherein $T_a$ represents the first T matrix, $t_1$ represents the first t matrix, $V_a$ represents the first output matrix, $r_a$ represents the second random matrix, $B_1$ represents the column full rank matrix, and a space in which $B_1$ belongs to is in s×r dimensions;

computing, by the third participant, a second t matrix according to a formula $t_2=B_2 R_c$, and sending the second t matrix to the second participant, wherein $t_2$ represents the second t matrix, $B_2$ represents the row full rank matrix, and a space in which $B_2$ belongs to is in r×t dimensions;

generating, by the second participant, a second output matrix based on the first T matrix, the first t matrix, and the second t matrix, computing a second S matrix according to a formula $S_b=t_1 \cdot t_2=R_a B_1 \cdot B_2 R_c=R_a \hat{B} R_c$, computing a second T matrix through a formula $T_b=T_a-M_b+S_b-V_b-r_b$ according to the second S matrix, and sending the second T matrix to the third participant, wherein $S_b$ represents the second S matrix, Tb represents the second T matrix, $V_b$ represents the second output matrix, and $R_b$ represents the fourth random matrix; and computing, by the third participant, a third output matrix according to a formula $V_c=T_b-M_c+S_c-r_c$, wherein $V_c$ represents the third output matrix, and $r_c$ represents the sixth random matrix;

the second computational process comprising:

computing, by the first participant, a first internal matrix according to a formula $\hat{A}=A+R_a$, and sending the first internal matrix to the second participant;

computing, by the third participant, a third internal matrix according to a formula $\hat{C}=C+R_c$, and sending the third internal matrix to the second participant;

computing, by the second participant, a second internal matrix, a second M matrix, a first intermediate term matrix, a second intermediate term matrix, a third intermediate term matrix, and a fourth intermediate term matrix according to formulas $\hat{B}=B+B_b$, $M_b=\hat{A} \cdot R_b \cdot \hat{C}$, $\varphi_1=\hat{A} \cdot \hat{B}$, $\gamma_1=\hat{A} \cdot R_b$, $\varphi_2=\hat{B} \cdot \hat{C}$ and $\gamma_2=R_b \cdot \hat{C}$, sending the third intermediate term matrix and the fourth intermediate term matrix to the first participant, and sending the first intermediate term matrix and the second intermediate term matrix to the third participant;

computing, by the first participant, a first S matrix and a first M matrix according to formulas $S_a=R_a \cdot \gamma_2=R_a \cdot R_b \hat{C}$ and $M_a=A \cdot \varphi_2=A \cdot \hat{B} \cdot \hat{C}$;

computing, by the third participant, a third S matrix and a third M matrix according to formulas $S_c=\gamma_1 \cdot R_c=\hat{A} R_b \cdot R_c$ and $M_c=\varphi_1 \cdot R_c=\hat{A} \cdot \hat{B} \cdot R_c$;

splitting, by the second participant, the second internal matrix into a column full rank matrix and a row full rank matrix by means of full rank decomposition, sending the column full rank matrix to the first participant, and sending the row full rank matrix to the third participant;

generating, by the first participant, a first output matrix based on the column full rank matrix, computing a first T matrix and a first t matrix according to formulas $T_a=M_a+S_a-V_a-r_a$ and $t_1=R_aB_1$, sending the first T matrix to the second participant, and sending the first t matrix to the third participant;

computing, by the third participant, a second t matrix according to a formula $t_2=B_2R_c$;

generating, by the second participant, a second output matrix based on the first T matrix, computing a second T matrix according to a formula $T_b=T_a-M_b-V_b-r_b$, and sending the second T matrix to the third participant;

computing, by the third participant, a second S matrix according to the formula $S_b=t_1\cdot t_2=R_aB_1\cdot B_2R_c=R_a\hat{B}R_c$, and computing a third output matrix through a formula $V_c=T_b+S_b-M_c+S_c-r_c$ according to the second S matrix and the second T matrix;

the third computational process comprising:

computing, by the first participant, a first internal matrix according to a formula $\hat{A}=A+R_a$, and sending the first internal matrix to the second participant;

computing, by the third participant, a third internal matrix according to a formula $\hat{C}=C+R_c$, and sending the third internal matrix to the second participant;

computing, by the second participant, a second internal matrix, a second M matrix, a first intermediate term matrix, a second intermediate term matrix, a third intermediate term matrix, and a fourth intermediate term matrix according to formulas $\hat{B}=B+B_b$, $M_b=\hat{A}\cdot R_b\cdot\hat{C}$, $\varphi_1=\hat{A}\cdot\hat{B}$, $\gamma_1=\hat{A}\cdot R_b$, $\varphi_2=\hat{B}\cdot\hat{C}$ and $\gamma_2=R_b\cdot\hat{C}$, sending the third intermediate term matrix and the fourth intermediate term matrix to the first participant, and sending the first intermediate term matrix and the second intermediate term matrix to the third participant;

computing, by the first participant, a first S matrix and a first M matrix according to formulas $S_a=R_a\cdot\gamma_2=R_a\cdot R_b\hat{C}$ and $M_a=A\cdot\varphi_2=A\cdot\hat{B}\cdot\hat{C}$;

computing, by the third participant, a third S matrix and a third M matrix according to formulas $S_c=\gamma_1\cdot R_c=\hat{A}R_b\cdot R_c$ and $M_c=\varphi_1\cdot R_c=\hat{A}\cdot\hat{B}\cdot R_c$;

sending, by the second participant, the second internal matrix to the first participant;

generating, by the first participant, a first output matrix based on the second internal matrix, computing a first T matrix and a first t matrix according to formulas $T_a=M_a+S_a-V_a-r_a$ and $t_1=R_a\hat{B}$, sending the first T matrix to the second participant, and sending the first t matrix to the third participant;

computing, by the third participant, a second S matrix according to a formula $S_b=t\cdot R_c=R_a\hat{B}R_c$;

generating, by the second participant, a second output matrix based on the first T matrix, computing a second T matrix according to a formula $T_b=T_a-M_b-V_b-r_b$, and sending the second T matrix to the third participant; and computing, by the third participant, a third output matrix according to a formula $V_c=T_b+S_b-M_c+S_c-r_c$, wherein the first security constraint is $r(\hat{B})<\min\{s,t\}$, the second security constraint is $r(\hat{B})<s$, the third security constraint is $r(\hat{A})<s$, $r(\hat{B})<\min\{s,t\}$ and $r(\hat{C})<t$, the fourth security constraint is $r(\hat{A})<s$, $r(\hat{C})<t$ and $r(B_1)<s$, the fifth security constraint is $r(\hat{A})<s$, $r(\hat{B})<s$ and $r(\hat{C})<t$, and $r(\ )$ represents a rank of a matrix.

6. The electronic device according to claim 5, wherein the performing, by the computation requestor, an operation on the first output matrix, the second output matrix, and the third output matrix according to the target requirement specifically comprises:

if the target requirement of the computation requestor is computing a product of a three-party matrix, determining a sum value of the first output matrix, the second output matrix, and the third output matrix as a product of the three-party matrix; or a product of the three-party matrix is a product of the first private data matrix, the second private data matrix, and the third private data matrix.

7. The electronic device according to claim 5, wherein a sum of the second random matrix, the fourth random matrix, and the sixth random matrix is equal to a product of the first random matrix, the third random matrix, and the fifth random matrix.

8. The electronic device according to claim 5, wherein the column full rank matrix and the row full rank matrix meet a constraint condition $r(\hat{B})=r(B_1)=r(B_2)=r$.

9. A non-transitory computer-readable storage medium, wherein the computer-readable storage medium stores a computer program, and the computer program is executed by a processor to implement the anti-malicious method for a secure three-party computation, wherein the method comprising:

determining a first private data matrix, a second private data matrix, and a third private data matrix, wherein the first private data matrix is in n×s dimensions, held by a first participant, and stored in a first compute node associated with the first participant, the second private data matrix is in s×t dimensions, held by a second participant, and stored in a second compute node associated with the second participant, and the third private data matrix is in t×m dimensions, held by a third participant, and stored in a third compute node associated with the third participant;

receiving, by the first participant, a first random matrix pair generated by a commodity server node, wherein the first random matrix pair comprises a first random matrix in the n×s dimensions and a second random matrix in n×m dimensions;

receiving, by the second participant, a second random matrix pair generated by the commodity server node, wherein the second random matrix pair comprises a third random matrix in the s×t dimensions and a fourth random matrix in the n×m dimensions;

receiving, by the third participant, a third random matrix pair generated by the commodity server node, wherein the third random matrix pair comprises a fifth random matrix in the t×m dimensions and a sixth random matrix in the n×m dimensions;

determining whether a collusion behavior exists when the first participant, the second participant, and the third participant perform a secure computation process;

if no collusion behavior exists, performing a first computational process that meets a first security constraint, a second computational process without a security constraint, or a third computational process that meets a second security constraint, to obtain a first output matrix output by the first participant, a second output matrix output by the second participant, and a third output matrix output by the third participant;

if the collusion behavior exists, performing a first computational process that meets a third security constraint, a second computational process that meets a fourth security constraint, or a third computational process that meets a fifth security constraint, to obtain a first output matrix output by the first participant, a second output matrix output by the second participant, and a third output matrix output by the third participant;

obtaining, by a computation requestor, the first output matrix, the second output matrix, and the third output matrix, and performing an operation on the first output matrix, the second output matrix, and the third output matrix according to a target requirement;

the first computational process comprising:

computing, by the first participant, a first internal matrix according to a formula $\hat{A}=A+R_a$, and sending the first internal matrix to the second participant, wherein $\hat{A}$ represents the first internal matrix, A represents the first private data matrix, and Ra represents the first random matrix;

computing, by the third participant, a third internal matrix according to a formula $\hat{C}=C+R_c$, and sending the third internal matrix to the second participant, wherein $\hat{C}$ represents the third internal matrix, C represents the third private data matrix, and $R_c$ represents the fifth random matrix;

computing, by the second participant, a second internal matrix, a second M matrix, a first intermediate term matrix, a second intermediate term matrix, a third intermediate term matrix, and a fourth intermediate term matrix according to formulas $\hat{B}=B+B_b$, $M_b=\hat{A}\cdot R_b\cdot\hat{C}$, $\varphi_1=\hat{A}\cdot\hat{B}$, $\gamma_1=\hat{A}\cdot R_b$, $\varphi_2=\hat{B}\cdot\hat{C}$ and $\gamma_2=R_b\cdot\hat{C}$, sending the third intermediate term matrix and the fourth intermediate term matrix to the first participant, and sending the first intermediate term matrix and the second intermediate term matrix to the third participant, wherein $\hat{B}$ represents the second internal matrix, $M_b$ represents the second M matrix, $\varphi_1$ represents the first intermediate term matrix, $\gamma_1$ represents the second intermediate term matrix, $\varphi_2$ represents the third intermediate term matrix, $\gamma_2$ represents the fourth intermediate term matrix, B represents the second private data matrix, and $R_b$ represents the third random matrix;

computing, by the first participant, a first S matrix and a first M matrix according to formulas $S_a=R_a\cdot\gamma_2=R_a\cdot R_b\hat{C}$ and $M_a=A\cdot\varphi_2=A\cdot\hat{B}\cdot\hat{C}$, wherein $S_a$ represents the first S matrix, and $M_a$ represents the first M matrix;

computing, by the third participant, a third S matrix and a third M matrix according to formulas $S_c=\gamma_1\cdot R_c=\hat{A}R_b\cdot R_c$ and $M_c=\varphi_1\cdot R_c=\hat{A}\cdot\hat{B}\cdot R_c$, wherein $S_c$ represents the third S matrix, and $M_c$ represents the third M matrix;

splitting, by the second participant, the second internal matrix into a column full rank matrix and a row full rank matrix by means of full rank decomposition, sending the column full rank matrix to the first participant, and sending the row full rank matrix to the third participant;

generating, by the first participant, a first output matrix based on the column full rank matrix, computing a first T matrix and a first t matrix according to formulas $T_a=M_a+S_a-V_a-r_a$ and $t_1=R_aB_1$, and sending the first T matrix and the first t matrix to the second participant, wherein $T_a$ represents the first T matrix, $t_1$ represents the first t matrix, $V_a$ represents the first output matrix, $r_a$ represents the second random matrix, $B_1$ represents the column full rank matrix, and a space in which $B_1$ belongs to is in s×r dimensions;

computing, by the third participant, a second t matrix according to a formula $t_2=B_2R_c$, and sending the second t matrix to the second participant, wherein $t_2$ represents the second t matrix, $B_2$ represents the row full rank matrix, and a space in which $B_2$ belongs to is in r×t dimensions;

generating, by the second participant, a second output matrix based on the first T matrix, the first t matrix, and the second t matrix, computing a second S matrix according to a formula $S_b=t_1\cdot t_2=R_aB_1\cdot B_2R_c=R_a\hat{B}R_c$, computing a second T matrix through a formula $T_b=T_a-M_b+S_b-V_b-r_b$ according to the second S matrix, and sending the second T matrix to the third participant, wherein $S_b$ represents the second S matrix, Tb represents the second T matrix, $V_b$ represents the second output matrix, and $R_b$ represents the fourth random matrix; and computing, by the third participant, a third output matrix according to a formula $V_c=T_b-M_c+S_c-r_c$, wherein $V_c$ represents the third output matrix, and $r_c$ represents the sixth random matrix;

the second computational process comprising:

computing, by the first participant, a first internal matrix according to a formula $\hat{A}=A+R_a$, and sending the first internal matrix to the second participant;

computing, by the third participant, a third internal matrix according to a formula $\hat{C}=C+R_c$, and sending the third internal matrix to the second participant;

computing, by the second participant, a second internal matrix, a second M matrix, a first intermediate term matrix, a second intermediate term matrix, a third intermediate term matrix, and a fourth intermediate term matrix according to formulas $\hat{B}=B+B_b$, $M_b=\hat{A}\cdot R_b\cdot\hat{C}$, $\varphi_1=\hat{A}\cdot\hat{B}$, $\gamma_1=\hat{A}\cdot R_b$, $\varphi_2=\hat{B}\cdot\hat{C}$ and $\gamma_2=R_b\cdot\hat{C}$, sending the third intermediate term matrix and the fourth intermediate term matrix to the first participant, and sending the first intermediate term matrix and the second intermediate term matrix to the third participant;

computing, by the first participant, a first S matrix and a first M matrix according to formulas $S_a=R_a\cdot\gamma_2=R_a\cdot R_b\hat{C}$ and $M_a=A\cdot\varphi_2=A\cdot\hat{B}\cdot\hat{C}$;

computing, by the third participant, a third S matrix and a third M matrix according to formulas $S_c=\gamma_1\cdot R_c=\hat{A}R_b\cdot R_c$ and $M_c=\varphi_1\cdot R_c=\hat{A}\cdot\hat{B}\cdot R_c$;

splitting, by the second participant, the second internal matrix into a column full rank matrix and a row full rank matrix by means of full rank decomposition, sending the column full rank matrix to the first participant, and sending the row full rank matrix to the third participant;

generating, by the first participant, a first output matrix based on the column full rank matrix, computing a first T matrix and a first t matrix according to formulas $T_a=M_a+S_a-V_a-r_a$ and $t_1=R_aB_1$, sending the first T matrix to the second participant, and sending the first t matrix to the third participant;

computing, by the third participant, a second t matrix according to a formula $t_2=B_2R_c$;

generating, by the second participant, a second output matrix based on the first T matrix, computing a second T matrix according to a formula $T_b=T_a-M_b-V_b-r_b$, and sending the second T matrix to the third participant;

computing, by the third participant, a second S matrix according to the formula $S_b=t_1\cdot t_2=R_aB_1\cdot B_2R_c=R_a\hat{B}R_c$, and computing a third output matrix through a formula $V_c=T_b+S_b-M_c+S_c-r_c$ according to the second S matrix and the second T matrix;

the third computational process comprising:

computing, by the first participant, a first internal matrix according to a formula $\hat{A}=A+R_a$, and sending the first internal matrix to the second participant;

computing, by the third participant, a third internal matrix according to a formula $\hat{C}=C+R_c$, and sending the third internal matrix to the second participant;

computing, by the second participant, a second internal matrix, a second M matrix, a first intermediate term matrix, a second intermediate term matrix, a third intermediate term matrix, and a fourth intermediate term matrix according to formulas $\hat{B}=B+B_b$, $M_b=\hat{A}\cdot R_b\cdot\hat{C}$, $\varphi_1=\hat{A}\cdot\hat{B}$, $\gamma_1=\hat{A}\cdot R_b$, $\varphi_2=\hat{B}\cdot\hat{C}$ and $\gamma_2=R_b\cdot\hat{C}$, sending the third intermediate term matrix and the fourth intermediate term matrix to the first participant, and sending the first intermediate term matrix and the second intermediate term matrix to the third participant;

computing, by the first participant, a first S matrix and a first M matrix according to formulas $S_a=R_a\cdot\gamma_2=R_a\cdot R_b\hat{C}$ and $M_a=A\cdot\varphi_2=A\cdot\hat{B}\cdot\hat{C}$;

computing, by the third participant, a third S matrix and a third M matrix according to formulas $S_c=\gamma_1\cdot R_c=\hat{A}R_b\cdot R_c$ and $M_c=\varphi_1\cdot R_c=\hat{A}\cdot\hat{B}\cdot R_c$;

sending, by the second participant, the second internal matrix to the first participant;

generating, by the first participant, a first output matrix based on the second internal matrix, computing a first T matrix and a first t matrix according to formulas $T_a=M_a+S_a-V_a-r_a$ and $t_1=R_a\hat{B}$, sending the first T matrix to the second participant, and sending the first t matrix to the third participant;

computing, by the third participant, a second S matrix according to a formula $S_b=t\cdot R_c=R_a\hat{B}R_c$;

generating, by the second participant, a second output matrix based on the first T matrix, computing a second T matrix according to a formula $T_b=T_a-M_b-V_b-r_b$, and sending the second T matrix to the third participant; and computing, by the third participant, a third output matrix according to a formula $V_c=T_b+S_b-M_c+S_c-r_c$, wherein the first security constraint is $(\hat{B})<\min\{s,t\}$, the second security constraint is $r(\hat{B})<s$, the third security constraint is $r(\hat{A})<s$, $r(\hat{B})<\min\{s,t\}$ and $r(\hat{C})<t$, the fourth security constraint is $r(\hat{A})<s$, $r(\hat{C})<t$ and $r(B_1)<s$, the fifth security constraint is $(\hat{A})<s$, $r(\hat{B})<s$ and $r(\hat{C})<t$, and $r(\ )$ represents a rank of a matrix.

10. The non-transitory computer-readable storage medium according to claim 9, wherein the performing, by the computation requestor, an operation on the first output matrix, the second output matrix, and the third output matrix according to the target requirement specifically comprises:

if the target requirement of the computation requestor is computing a product of a three-party matrix, determining a sum value of the first output matrix, the second output matrix, and the third output matrix as a product of the three-party matrix; or a product of the three-party matrix is a product of the first private data matrix, the second private data matrix, and the third private data matrix.

11. The non-transitory computer-readable storage medium according to claim 9, wherein a sum of the second random matrix, the fourth random matrix, and the sixth random matrix is equal to a product of the first random matrix, the third random matrix, and the fifth random matrix.

12. The non-transitory computer-readable storage medium according to claim 9, wherein the column full rank matrix and the row full rank matrix meet a constraint condition $r(\hat{B})=r(B_1)=r(B_2)=r$.

* * * * *